(12) United States Patent
Li et al.

(10) Patent No.: US 10,085,166 B2
(45) Date of Patent: Sep. 25, 2018

(54) BASE STATION DEVICE, USER EQUIPMENT, AND METHOD FOR REPORTING CHANNEL STATE INFORMATION

(71) Applicant: Huawei Technologies Co., Ltd., Shenzhen (CN)

(72) Inventors: Bo Li, Beijing (CN); Chaojun Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 15/356,003

(22) Filed: Nov. 18, 2016

(65) Prior Publication Data

US 2017/0070905 A1    Mar. 9, 2017

Related U.S. Application Data

(63) Continuation of application No. PCT/CN2014/077798, filed on May 19, 2014.

(51) Int. Cl.
*H04W 24/10* (2009.01)
*H04W 72/04* (2009.01)
(Continued)

(52) U.S. Cl.
CPC .......... *H04W 24/10* (2013.01); *H04B 7/0626* (2013.01); *H04B 7/0647* (2013.01); *H04L 5/0048* (2013.01); *H04W 72/0446* (2013.01)

(58) Field of Classification Search
CPC .. H04W 24/10; H04W 72/0446; H04L 5/0048
See application file for complete search history.

(56) References Cited

U.S. PATENT DOCUMENTS

2006/0148411 A1    7/2006   Cho et al.
2012/0082049 A1    4/2012   Chen et al.
(Continued)

FOREIGN PATENT DOCUMENTS

CN    102291223 A    12/2011
CN    102291224 A    12/2011
(Continued)

OTHER PUBLICATIONS

"3$^{rd}$ Generation Partnership Project; Technical Specification Group Radio Access Network; Evolved Universal Terrestrial Radio Access (E-UTRA); Physical layer procedures (Release 12)," 3GPP TS 36.213, V12.1.0, pp. 1-186, 31$^{rd}$ Generation Partnership Project, Valbonne, France (Mar. 2014).
(Continued)

*Primary Examiner* — Gbemileke J Onamuti
(74) *Attorney, Agent, or Firm* — Leydig, Voit & Mayer, Ltd.

(57) ABSTRACT

A base station device, user equipment, and a method for reporting channel state information are disclosed. The base station device receives at least one piece of aperiodic channel state information (CSI) from user equipment, where the at least one piece of aperiodic CSI corresponds to an aperiodic CSI measurement result on a first reference subframe, the aperiodic CSI measurement result on the first reference subframe is an aperiodic CSI measurement result of a first downlink subframe set, and the first reference subframe is a subframe in the first downlink subframe set. The base station device effectively receives an aperiodic channel state measurement result of the downlink subframe set.

8 Claims, 11 Drawing Sheets

(51) Int. Cl.
*H04L 5/00* (2006.01)
*H04B 7/06* (2006.01)

(56) References Cited

U.S. PATENT DOCUMENTS

| | | |
|---|---|---|
| 2012/0176925 A1 | 7/2012 | Hwang |
| 2013/0294351 A1 | 11/2013 | Kwon et al. |
| 2015/0071187 A1 | 3/2015 | Chen et al. |
| 2015/0146557 A1 | 5/2015 | Pan et al. |
| 2015/0180634 A1 | 6/2015 | Hoshino et al. |

FOREIGN PATENT DOCUMENTS

| | | |
|---|---|---|
| CN | 103155630 A | 6/2013 |
| CN | 103427938 A | 12/2013 |
| EP | 3140926 A1 | 3/2017 |
| JP | 2014506422 A | 3/2014 |
| KR | 20120083192 A | 7/2012 |
| RU | 2364046 C2 | 8/2009 |
| WO | 2013020475 A1 | 2/2013 |
| WO | 2014020828 A1 | 2/2014 |
| WO | 2015168925 A1 | 11/2015 |

OTHER PUBLICATIONS

"Discussion on interference measurement for MU-CSI," 3GPP TSG RAN WG1 Meeting #73, Fukuoka Japan, R1-132103, pp. 1-4, 3rd Generation Partnership Project, Valbonne, France (May 20-24, 2013).

"Final Report of 3GPP TSG RAN WG1 #70bis v.1.0.0 (San Diego, USA, Oct. 8-12, 2012)," 3GPP TSG RAN WG1 Meeting #71, New Orleans, USA, R1-124676, pp. 1-94, Valbonne, France (Nov. 12-16, 2012).

"Discussion on Aperiodic CSI in TM1-9 for eIMTA," 3GPP TSG RAN WG1 Meeting #76bis, Shenzhen, China, R1-141620, pp. 1-4, 3rd Generation Partnership Project, Valbonne, France (Mar. 31-Apr. 4, 2014).

"Aperiodic CSI reporting in TM1-9 for eIMTA," 3GPP TSG RAN WG1 Meeting #76bis R1-141317, 3rd Generation artnership Project, Valbonne, France (Mar. 31-Apr. 4, 2014).

"Discussion on remaining details for CSI feedback," 3GPP TSG RAN WG1 Meeting #77, Seoul, Korea, R1-142332, 3rd Generation Partnership Project, Valbonne, France (May 19-23, 2014).

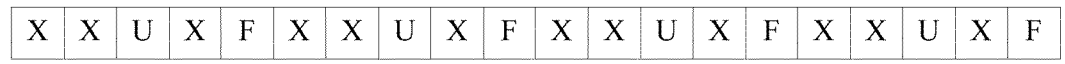
FIG. 1
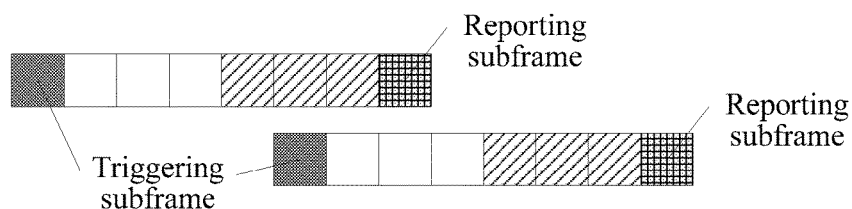
FIG. 2
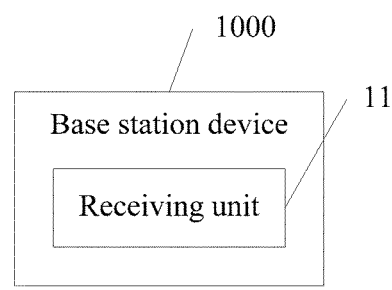
FIG. 3
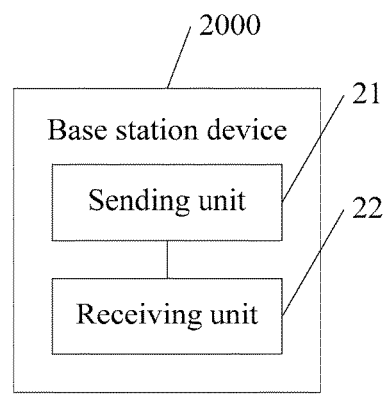
FIG. 4

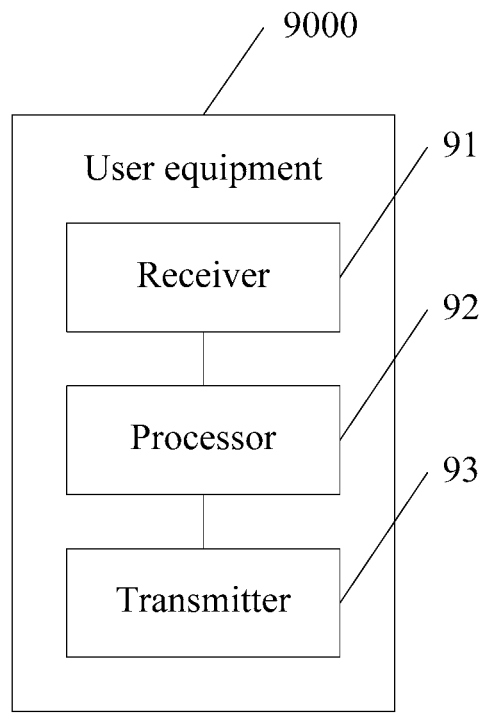

FIG. 13

Receive at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set  —  S101

FIG. 14

BASE STATION DEVICE, USER EQUIPMENT, AND METHOD FOR REPORTING CHANNEL STATE INFORMATION

CROSS-REFERENCE TO RELATED APPLICATIONS

This application is a continuation of International Patent Application No. PCT/CN2014/077798, filed on May 19, 2014, the disclosure of which is hereby incorporated by reference in its entirety.

TECHNICAL FIELD

The present invention relates to the field of communications technologies, and in particular, to a base station device, user equipment, and a method for reporting channel state information.

BACKGROUND

In a time division duplex (TDD) system, receiving and sending are completed at different time of a same frequency band, that is, an uplink and a downlink are differentiated in terms of time. A Long Term Evolution (LTE) system can support seven different uplink-downlink subframe configurations. In a system before LTE Rel-12, all user equipments (UE) in a cell are notified of a specific used uplink-downlink subframe configuration by using a broadcast message SIB 1, while in a Rel-12 system, all UEs in a cell are notified by using a physical control channel (PDCCH), and in Rel-12, an uplink-downlink subframe configuration actually used by a UE may be different from an uplink-downlink subframe configuration indicated in a SIB 1. In the Rel-12 system, an uplink-downlink subframe configuration used by a UE may be changed within a short period of time, for example, may be changed within a time period of 10 ms, and in the Rel-12 system, such a manner of quickly changing uplink-downlink subframe configuration information is referred to as dynamic TDD subframe configuration.

When dynamic TDD subframe configuration is used in the TDD system, different changes may occur in uplink-downlink subframe configurations of a local cell and a neighboring cell. In this case, a downlink subframe of the local cell may be interfered with by an uplink subframe from the neighboring cell, an uplink subframe of the local cell may also be interfered with by a downlink subframe of the neighboring cell, and the two types of interference are both referred to as contradirectional interference. Conversely, an uplink subframe from the neighboring cell may cause interference to an uplink subframe of the local cell, or a downlink subframe of the neighboring cell may cause interference to a downlink subframe of the local cell, and the two types of interference are both referred to as codirectional interference. As shown in FIG. 1, according to a difference in interference from a neighboring cell, downlink subframes 0, 1, 3, 5, 6, and 8 (which are marked as X) of a local cell may be grouped into a first subframe set, downlink subframes 4 and 9 (which are marked as F) may be grouped into a second subframe set, and U represents an uplink subframe. In a wireless communications system such as an LTE or an advanced Long Term Evolution (LTE-A) system, to improve transmission efficiency of the system and improve quality of service of a UE, the UE needs to measure channel state information (CSI) and reports the CSI to a base station device. CSI reporting includes periodic CSI reporting and aperiodic CSI reporting. A base station device configures an aperiodic CSI reporting mode in a semi-static manner by using higher layer signaling, and triggers aperiodic CSI reporting by using physical layer signaling. After receiving aperiodic CSI triggering signaling, user equipment reports aperiodic CSI. A timing relationship between an aperiodic CSI triggering subframe and a reporting subframe N is determined according to timing of an uplink reference subframe configuration.

In the prior art, a subframe of an available CSI measurement subframe resource needs to be located between an aperiodic CSI triggering subframe and reporting subframes N−4. As shown in FIG. 2, a subframe 0 triggers a subframe 7 to report aperiodic CSI, and therefore, a CSI measurement subframe may be located in a subframe 0, 1, or 3, where a subframe 2 is an uplink subframe. Similarly, a subframe 5 triggers a subframe 12 to report aperiodic CSI, and therefore, a CSI measurement subframe may be located in a subframe 5, 6, or 8, where the subframe 7 is an uplink subframe. According to the example of downlink subframe grouping in FIG. 1, it can be seen that the subframes 0, 1, 3, 5, 6, and 8 all belong to the first subframe set. Therefore, regardless of which downlink subframe is used for triggering, CSI measurement of the second subframe set cannot be performed. As a result, aperiodic CSI of the second subframe set cannot be reported.

A solution in the prior art is that: if there is no resource that can be used for measurement in a corresponding subframe set, aperiodic CSI information corresponding to the subframe set is not reported, or a piece of latest recorded CSI information of a corresponding subframe is reported. As shown in FIG. 2, because there is no CSI measurement subframe resource in the second subframe set, after receiving a corresponding aperiodic CSI triggering indication, a UE may report (out of range, OOR) information and may not report aperiodic CSI, or may report a last piece of available aperiodic CSI measurement information. Such a manner causes that a corresponding CSI of the second subframe set cannot be reported.

In conclusion, a problem that aperiodic CSI of some downlink subframe sets in a radio frame cannot be reported needs to be resolved.

SUMMARY

Embodiments of the present invention provide a base station device, user equipment, and a method for reporting channel state information, which can ensure that a base station device effectively receives an aperiodic channel state measurement result, which is sent by user equipment, of a downlink subframe set.

According to a first aspect, a base station device is provided, including:

a receiving unit, configured to receive at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set.

In a first possible implementation manner, the base station device further includes:

a sending unit, configured to send aperiodic CSI triggering signaling to the user equipment on a first downlink subframe, where the aperiodic CSI triggering signaling is used to instruct the user equipment to send the aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among the at least one piece of aperiodic CSI.

With reference to the first aspect or the first possible implementation manner of the first aspect, in a second possible implementation manner, the sending unit is further configured to:

send first signaling to the user equipment, where the first signaling is used to indicate the first reference subframe.

With reference to the first aspect or the first possible implementation manner of the first aspect, in a third possible implementation manner, the first reference subframe is a subframe randomly selected by the user equipment from the first downlink subframe set.

With reference to the first aspect or the first possible implementation manner of the first aspect, in a fourth possible implementation manner, the first reference subframe is a subframe determined by the user equipment according to a preset rule in the first downlink subframe set, and the preset rule includes:

the first reference subframe is a subframe whose subframe index is the largest in the first downlink subframe set; or the first reference subframe is a subframe whose subframe index is the smallest in the first downlink subframe set.

With reference to the fourth possible implementation manner of the first aspect, in a fifth possible implementation manner, the sending unit is further configured to:

send second signaling to the user equipment, where the second signaling is used to indicate the preset rule.

According to a second aspect, user equipment is provided, including:

a determining unit, configured to determine a first reference subframe;

a measurement unit, configured to perform aperiodic channel state information CSI measurement on the first reference subframe; and a sending unit, configured to send at least one piece of aperiodic CSI to a base station device, where the at least one piece of aperiodic CSI information corresponds to an aperiodic CSI measurement result on the first reference subframe, where the aperiodic CSI measurement result on the first reference subframe is an aperiodic CSI measurement result of a first downlink subframe set, and the first reference subframe is a subframe in the first downlink subframe set.

In a first possible implementation manner, the user equipment further includes:

a receiving unit, configured to receive, on a first downlink subframe, aperiodic CSI triggering signaling sent by the base station device, where the aperiodic CSI triggering signaling is used to instruct the user equipment to send the aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among the at least one piece of aperiodic CSI.

With reference to the second aspect or the first possible implementation manner of the second aspect, in a second possible implementation manner, the receiving unit is further configured to:

receive first signaling sent by the base station device, where the first signaling is used to indicate the first reference subframe; and the determining unit is specifically configured to:

determine the first reference subframe according to the first signaling.

With reference to the second aspect or the first possible implementation manner of the second aspect, in a third possible implementation manner, the determining unit includes:

a selection unit, configured to randomly select a subframe from the first downlink subframe set as the first reference subframe.

With reference to the second aspect or the first possible implementation manner of the second aspect, in a fourth possible implementation manner, the determining unit is specifically configured to:

determine the first reference subframe according to a preset rule, where the preset rule includes:

the first reference subframe is a subframe whose subframe index is the largest in the first downlink subframe set; or the first reference subframe is a subframe whose subframe index is the smallest in the first downlink subframe set.

With reference to the fourth possible implementation manner of the second aspect, in a fifth possible implementation manner, the receiving unit is further configured to:

receive second signaling sent by the base station device, where the second signaling is used to indicate the preset rule.

According to a third aspect, a base station device is provided, including:

a receiver, configured to receive at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set.

In a first possible implementation manner, the base station device further includes:

a transmitter, configured to send aperiodic CSI triggering signaling to the user equipment on a first downlink subframe, where the aperiodic CSI triggering signaling is used to instruct the user equipment to send the aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among the at least one piece of aperiodic CSI.

With reference to the third aspect or the first possible implementation manner of the third aspect, in a second possible implementation manner, the transmitter is further configured to:

send first signaling to the user equipment, where the first signaling is used to indicate the first reference subframe.

With reference to the third aspect or the first possible implementation manner of the third aspect, in a third possible implementation manner, the first reference subframe is a subframe randomly selected by the user equipment from the first downlink subframe set.

With reference to the third aspect or the first possible implementation manner of the third aspect, in a fourth possible implementation manner, the first reference subframe is a subframe determined by the user equipment according to a preset rule in the first downlink subframe set, and the preset rule includes:

the first reference subframe is a subframe whose subframe index is the largest in the first downlink subframe set; or the first reference subframe is a subframe whose subframe index is the smallest in the first downlink subframe set.

With reference to the fourth possible implementation manner of the third aspect, in a fifth possible implementation manner, the transmitter is further configured to:

send second signaling to the user equipment, where the second signaling is used to indicate the preset rule.

According to a fourth aspect, user equipment is provided, including:

a processor, configured to determine a first reference subframe, where the processor is further configured to perform aperiodic channel state information CSI measurement on the first reference subframe; and a transmitter, configured to send at least one piece of aperiodic CSI to a base station device, where the at least one piece of aperiodic CSI information corresponds to an aperiodic CSI measurement result on the first reference subframe, where the aperiodic CSI measurement result on the first reference subframe is an aperiodic CSI measurement result of a first downlink subframe set, and the first reference subframe is a subframe in the first downlink subframe set.

In a first possible implementation manner, the user equipment further includes:

a receiver, configured to receive, on a first downlink subframe, aperiodic CSI triggering signaling sent by the base station device, where the aperiodic CSI triggering signaling is used to instruct the user equipment to send the aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among the at least one piece of aperiodic CSI.

With reference to the fourth aspect or the first possible implementation manner of the fourth aspect, in a second possible implementation manner, the receiver is further configured to:

receive first signaling sent by the base station device, where the first signaling is used to indicate the first reference subframe; and the step of determining a first reference subframe performed by the processor includes:

determining the first reference subframe according to the first signaling.

With reference to the fourth aspect or the first possible implementation manner of the fourth aspect, in a third possible implementation manner, the step of determining a first reference subframe performed by the processor includes:

randomly selecting a subframe from the first downlink subframe set as the first reference subframe.

With reference to the fourth aspect or the first possible implementation manner of the fourth aspect, in a fourth possible implementation manner, the step of determining a first reference subframe performed by the processor includes:

determining the first reference subframe according to a preset rule, where the preset rule includes:

the first reference subframe is a subframe whose subframe index is the largest in the first downlink subframe set; or the first reference subframe is a subframe whose subframe index is the smallest in the first downlink subframe set.

With reference to the fourth possible implementation manner of the fourth aspect, in a fifth possible implementation manner, the receiver is further configured to:

receive second signaling sent by the base station device, where the second signaling is used to indicate the preset rule.

According to a fifth aspect, a method for reporting channel state information is provided, including:

receiving at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set.

In a first possible implementation manner, before the receiving at least one piece of aperiodic CSI sent by user equipment, the method further includes:

sending aperiodic CSI triggering signaling to the user equipment on a first downlink subframe, where the aperiodic CSI triggering signaling is used to instruct the user equipment to send the aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among the at least one piece of aperiodic CSI.

With reference to the fifth aspect or the first possible implementation manner of the fifth aspect, in a second possible implementation manner, before the receiving at least one piece of aperiodic CSI sent by user equipment, the method further includes:

send first signaling to the user equipment, where the first signaling is used to indicate the first reference subframe.

With reference to the fifth aspect or the first possible implementation manner of the fifth aspect, in a third possible implementation manner, the first reference subframe is a subframe randomly selected by the user equipment from the first downlink subframe set.

With reference to the fifth aspect or the first possible implementation manner of the fifth aspect, in a fourth possible implementation manner, the first reference subframe is a subframe determined by the user equipment according to a preset rule in the first downlink subframe set, and the preset rule includes:

the first reference subframe is a subframe whose subframe index is the largest in the first downlink subframe set; or the first reference subframe is a subframe whose subframe index is the smallest in the first downlink subframe set.

With reference to the fourth possible implementation manner of the fifth aspect, in a fifth possible implementation manner, before the receiving at least one piece of aperiodic CSI sent by user equipment, the method further includes:

sending second signaling to the user equipment, where the second signaling is used to indicate the preset rule.

According to a sixth aspect, a method for reporting channel state information is provided, including:

determining a first reference subframe;

performing aperiodic channel state information CSI measurement on the first reference subframe; and sending at least one piece of aperiodic CSI to a base station device, where the at least one piece of aperiodic CSI information corresponds to an aperiodic CSI measurement result on the first reference subframe, where the aperiodic CSI measurement result on the first reference subframe is an aperiodic CSI measurement result of a first downlink subframe set, and the first reference subframe is a subframe in the first downlink subframe set.

In a first possible implementation manner, before the performing aperiodic CSI measurement on the first reference subframe, the method further includes:

receiving, on a first downlink subframe, aperiodic CSI triggering signaling sent by the base station device, where the aperiodic CSI triggering signaling is used to instruct user equipment to send the aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among the at least one piece of aperiodic CSI.

With reference to the sixth aspect or the first possible implementation manner of the sixth aspect, in a second possible implementation manner, before the determining a first reference subframe, the method further includes:

receiving first signaling sent by the base station device, where the first signaling is used to indicate the first reference subframe; and the determining a first reference subframe includes:

determining the first reference subframe according to the first signaling.

With reference to the sixth aspect or the first possible implementation manner of the sixth aspect, in a third possible implementation manner, the determining a first reference subframe includes:

randomly selecting a subframe from the first downlink subframe set as the first reference subframe.

With reference to the sixth aspect or the first possible implementation manner of the sixth aspect, in a fourth possible implementation manner, the determining a first reference subframe includes:

determining the first reference subframe according to a preset rule, where the preset rule includes:

the first reference subframe is a subframe whose subframe index is the largest in the first downlink subframe set; or the first reference subframe is a subframe whose subframe index is the smallest in the first downlink subframe set.

With reference to the fourth possible implementation manner of the sixth aspect, in a fifth possible implementation manner, before the determining the first reference subframe according to a preset rule, the method further includes:

receiving second signaling sent by the base station device, where the second signaling is used to indicate the preset rule.

It can be seen that by performing aperiodic CSI measurement on a set reference subframe in a downlink subframe set, the embodiments of the present invention can ensure that a base station device effectively receives an aperiodic channel state measurement result, which is sent by user equipment, of the downlink subframe set.

BRIEF DESCRIPTION OF DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a schematic diagram of an example for a radio frame;

FIG. 2 is a schematic diagram of measurement of aperiodic channel state information CSI on a reference subframe in the prior art;

FIG. 3 is a schematic structural diagram of a base station device according to an embodiment of the present invention;

FIG. 4 is a schematic structural diagram of another base station device according to an embodiment of the present invention;

FIG. 13 is a schematic structural diagram of still another user equipment according to an embodiment of the present invention;

FIG. 14 is a flowchart of a method for reporting channel state information according to an embodiment of the present invention;

DESCRIPTION OF EMBODIMENTS

Figure 5:
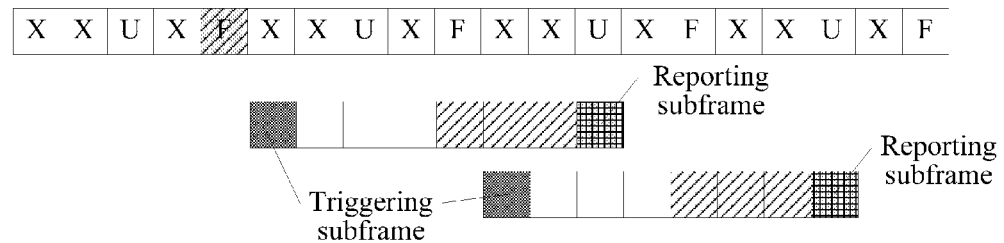
FIG. 5 is a schematic diagram of measurement of aperiodic channel state information CSI on a reference subframe determined by using an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

First, an uplink-downlink subframe configuration is described. In an existing LTE TDD system, there are seven types of configurations, and for details, refer to the following Table 1. D represents downlink, U represents uplink, and S represents a special subframe. The special subframe includes a downlink pilot timeslot (DWPTS), a guard period (GP), and an uplink pilot timeslot (UPPTS).

TABLE 1

Uplink-downlink subframe configuration

| Uplink-downlink configuration number | Downlink-to-uplink switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the LTE TDD system, a used uplink-downlink configuration is configured in a semi-static manner, and a configuration may be changed at shortest intervals of 640 milliseconds, which may cause that a current uplink-downlink configuration does not match transient uplink and downlink service volumes and therefore leads to inefficient resource utilization. This problem is particularly serious for a cell having a few users. Therefore, to effectively improve resource utilization, in a new-version system, a TDD uplink-downlink configuration can be changed dynamically, for example, an uplink-downlink configuration is changed at intervals of 10 ms-40 ms; a base station device notifies user equipment of a TDD uplink-downlink configuration by using a PDCCH, and because a PDCCH is relatively dynamic, dynamic changing of a TDD uplink-downlink configuration is implemented.

Refer to FIG. 3, which is a schematic structural diagram of a base station device according to an embodiment of the present invention. The base station device 1000 includes:

a receiving unit 11, configured to receive at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set. It should be noted that the first reference subframe is a subframe on which an aperiodic CSI reference resource is located, that is, the user equipment performs aperiodic CSI measurement on the first reference subframe.

In this embodiment, for example, dynamic TDD subframe configuration is used in an LTE system, changes in subframe configurations of a local cell and a neighboring cell may be different, and the neighboring cell may cause codirectional interference or contradirectional interference to the local cell. According to a subframe configuration of the neighboring cell, a base station device of the local cell can determine which downlink subframes of the local cell may be subject to contradirectional interference from subframes of the neighboring cell, and then groups these subframes into one set and groups downlink subframes of the local cell that are subject to only codirectional interference from subframes of the neighboring cell into another set. The base station device notifies the user equipment of configurations of the downlink subframe sets by using higher layer signaling. It should be noted that higher layer signaling is signaling that is sent from a higher layer and is received more slowly relative to physical layer signaling, and includes RRC (radio resource control) signaling, MAC (Media Access Control) signaling, and the like.

According to an existing aperiodic CSI reference resource configuration rule, there may be a case in which aperiodic CSI of a corresponding downlink subframe set cannot be effectively reported because there is no aperiodic CSI reference resource in the downlink subframe set. For example, a base station device groups subframes into a first downlink subframe set and a second downlink subframe set, and aperiodic CSI of the first downlink subframe set cannot be effectively reported. Therefore, in this embodiment, aperiodic CSI measurement is performed on a set reference subframe (that is, a first reference subframe), where the reference subframe is a subframe in the first downlink subframe set, and an aperiodic CSI measurement result on the reference subframe is used as an aperiodic CSI measurement result of the first downlink subframe set. The user equipment sends one or more pieces of aperiodic CSI to the base station device by using one or more uplink subframes; the receiving unit 11 of the base station device receives the one or more pieces of aperiodic CSI sent by the user equipment, thereby ensuring that the reported aperiodic CSI of the first downlink subframe set is effectively received.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

Further, the first reference subframe is set according to a subframe on which a periodic CSI reference resource is located. Preferably, the first reference subframe is set to be the same as the subframe on which the periodic CSI reference resource is located. In other words, the first reference subframe is set to be the same as a second reference subframe, where the second reference subframe is a subframe on which a periodic CSI reference resource is located, that is, the user equipment performs periodic CSI measurement on the second reference subframe, a periodic CSI measurement result on the second reference subframe is a periodic CSI measurement result of the first downlink subframe set, and the second reference subframe is a subframe in the first downlink subframe set. In this way, a restriction on a minimum UE capability required in a process of performing aperiodic CSI measurement and periodic CSI measurement by the UE is lowered.

It can be seen that according to a base station device provided in this embodiment of the present invention, a base station device receives a result of aperiodic CSI measurement, which is performed by user equipment on a set reference subframe in a downlink subframe set. In this way, it can be ensured that the base station device effectively receives the aperiodic channel state measurement result, which is sent by the user equipment, of the downlink subframe set.

Refer to FIG. 4, which is a schematic structural diagram of another base station device according to an embodiment of the present invention. The base station device 2000 includes.

A sending unit 21, configured to send aperiodic CSI triggering signaling to a user equipment on a first downlink subframe, where the aperiodic CSI triggering signaling is used to instruct the user equipment to send an aperiodic CSI measurement result of a first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among at least one piece of aperiodic CSI.

For example, the first downlink subframe set includes subframes 4 and 9, the first downlink subframe is a subframe 0, the first uplink subframe is a subframe 7, the second subframe is a subframe 3, and subframes between the first downlink subframe and the second subframe include subframes 0, 1, 2, and 3 and do not include any subframe in the first downlink subframe set.

In this embodiment, the base station device triggers, on a downlink subframe of a radio frame, the user equipment to perform aperiodic CSI reporting, and the user equipment performs aperiodic CSI reporting on an uplink subframe of the radio frame; a reference subframe for aperiodic CSI measurement should be located between the triggering subframe and the fourth subframe prior to the reporting subframe, and when a subframe between the triggering subframe and the fourth subframe prior to the reporting subframe does not include a downlink subframe set obtained through grouping by the base station device, aperiodic CSI of the downlink subframe set cannot be effectively reported. Herein, the triggering subframe is the first downlink subframe, and the reporting subframe is the first uplink subframe.

A receiving unit 22, configured to receive the at least one piece of aperiodic channel state information CSI sent by the user equipment, where the at least one piece of aperiodic CSI corresponds to an aperiodic CSI measurement result on a first reference subframe, where the aperiodic CSI measurement result on the first reference subframe is the aperiodic CSI measurement result of the first downlink subframe set, and the first reference subframe is a subframe in the first downlink subframe set.

When determining that a subframe between the triggering subframe and the fourth subframe prior to the reporting subframe does not include any subframe in the first downlink subframe set, the user equipment performs aperiodic CSI measurement on a set reference subframe, where the reference subframe is a subframe in the first downlink subframe set, and uses an aperiodic CSI measurement result on the reference subframe as an aperiodic CSI measurement result of the first downlink subframe set. The user equipment sends one or more pieces of aperiodic CSI to the base station device by using one or more uplink subframes. The receiving unit 22 of the base station device receives the one or more pieces of aperiodic CSI sent by the user equipment, thereby ensuring that the reported aperiodic CSI of the first downlink subframe set is effectively received.

There are the following implementation manners for determining the reference subframe in the first downlink subframe set.

In an implementation manner, the sending unit 21 is further configured to send first signaling to the user equipment, where the first signaling is used to indicate the first reference subframe.

For a CSI reference subframe in a first subframe set, the sending unit 21 of the base station device notifies the UE by using higher layer signaling, and notifies the UE of no more than one CSI reference subframe within each radio frame, thereby lowering a restriction on a minimum UE capability required in a process of performing aperiodic CSI measurement by the UE. In the prior art, as shown in FIG. 2, a CSI reference resource corresponding to aperiodic CSI reported on a subframe 12 may be located on a subframe 4, and a CSI reference resource corresponding to aperiodic CSI reported on a subframe 7 may be located on a subframe 9. This leads to a problem, that is, measurement needs to be performed in advance before aperiodic CSI reporting is triggered. Consequently, within each radio frame, CSI measurement needs to be performed multiple times. Not knowing on which subframe the base station device triggers aperiodic CSI measurement, the UE needs to perform measurement on the subframes 4 and 9 of each radio frame, so as to prepare for reporting of corresponding CSI information. Therefore, if the base station does not perform aperiodic CSI triggering, the UE performs measurement, which may be unnecessary, within each radio frame.

As shown in FIG. 5, the base station notifies, by using higher layer signaling, the UE that within each radio frame, a reference subframe for aperiodic CSI is fixed at the subframe 4. Regardless of which position an aperiodic CSI triggering subframe is located at, where in this example, a triggering position may be downlink a subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

In another implementation manner, the first reference subframe is a subframe randomly selected by the user equipment from the first downlink subframe set.

For an aperiodic CSI reference subframe in the first subframe set, the UE selects, within each radio frame, a subframe that is in a same subframe set as a corresponding reporting subframe as a CSI reference subframe, thereby lowering a restriction on a minimum UE capability required in a process of performing aperiodic CSI measurement by the UE.

Figure 6:
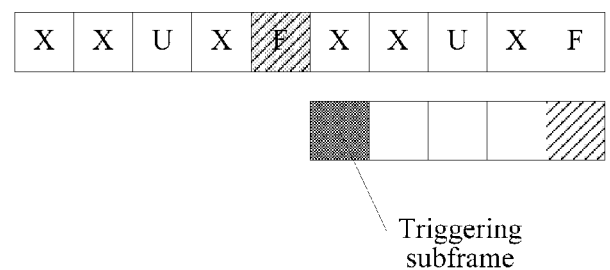
FIG. 6 is a schematic diagram of measurement of aperiodic channel state information CSI on a reference subframe determined by using another embodiment of the present invention.

As shown in FIG. 6, the UE may flexibly select the subframe 4 or subframe 9 as a reference subframe for aperiodic CSI. Therefore, by using this method, a minimum requirement on the UE can be effectively lowered, so that within each radio frame, the UE can report, by updating CSI measurement information only once, aperiodic CSI measurement information that is obtained through measurement on the radio frame or a previous radio frame and corresponds to a latest first subframe set during aperiodic CSI reporting.

Because there is no fixed CSI reference subframe in this embodiment, after receiving corresponding reported aperiodic CSI, the base station device does not specify a specific CSI reference subframe configuration, but the base station device may determine that content included in the aperiodic CSI is a result obtained through corresponding measurement on downlink subframes in first subframe sets in two latest radio frames.

In still another implementation manner, the first reference subframe is a subframe determined by the user equipment according to a preset rule in the first downlink subframe set, where the preset rule includes:

the first reference subframe is a subframe whose subframe index is the largest in the first downlink subframe set; or the first reference subframe is a subframe whose subframe index is the smallest in the first downlink subframe set; and the sending unit 21 is further configured to send second signaling to the user equipment, where the second signaling is used to indicate the preset rule.

For an aperiodic CSI reference subframe in the first subframe set, a predefined rule is used and measurement is performed on only one aperiodic CSI reference resource within each radio frame, so that a restriction on a minimum UE capability required in a process of performing aperiodic CSI measurement by the UE is lowered. The aperiodic CSI reference subframe may correspond to multiple pieces of reported aperiodic CSI.

The predefined rule may be that a set of downlink subframes corresponding to a same type of CSI reporting are sorted according to subframe indexes, and a subframe whose subframe index is the largest or whose subframe index is the smallest is selected as the CSI reference subframe corresponding to a subframe set 2.

As shown in FIG. 5, according to downlink subframe grouping information sent by the base station device, information about downlink subframes (the subframes 4 and 9) included in the first subframe set can be obtained. Because the first subframe set has the foregoing aperiodic CSI reference subframe configuration problem, a CSI reference subframe corresponding to two possible aperiodic CSI triggering subframes needs to be determined, whether aperiodic CSI triggering is performed on the subframe 0 or the subframe 5. If sorting is performed according to subframe indexes and a subframe whose subframe index is the smallest is used as the CSI reference subframe corresponding to the subframe set 2, in this example, the subframe 4 is selected as a reference subframe in each radio frame; if a subframe whose subframe index is the largest is used as the CSI reference subframe corresponding to the subframe set 2, in this example, the subframe 9 is selected as a reference subframe in each radio frame.

If selection is performed according to the smallest subframe index, the subframe 4 is the reference subframe for aperiodic CSI. Regardless of which position an aperiodic triggering subframe is located at, where in this example, a triggering position may be a downlink subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

It can be seen that according to a base station device provided in this embodiment of the present invention, a base station device receives an aperiodic CSI measurement result, which is performed by user equipment on a set reference subframe in a downlink subframe set. In this way, it can be ensured that the base station device effectively receives the aperiodic channel state measurement result, which is sent by the user equipment, of the downlink subframe set. The reference subframe may be determined according to an instruction notification, or may be selected by the user equipment, or may be determined according to a preset rule on which the base station device and the user equipment agree, and an implementation process is easy and convenient.

Figure 7:
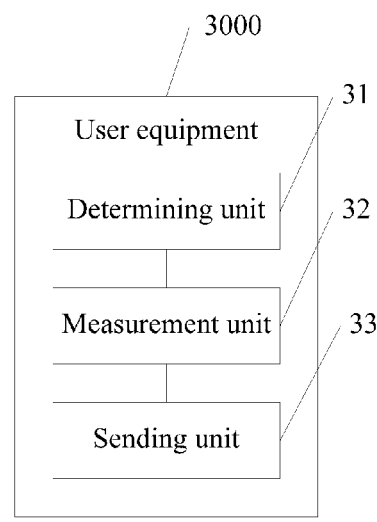
FIG. 7 is a schematic structural diagram of user equipment according to an embodiment of the present invention.

Refer to FIG. 7, which is a schematic structural diagram of user equipment according to an embodiment of the present invention. The user equipment 3000 includes:

A determining unit 31, configured to determine a first reference subframe.

In this embodiment, for example, dynamic TDD subframe configuration is used in an LTE system, changes in subframe configurations of a local cell and a neighboring cell may be different, and the neighboring cell may cause codirectional interference or contradirectional interference to the local cell. According to a subframe configuration of the neighboring cell, a base station device of the local cell can determine which downlink subframes of the local cell may be subject to contradirectional interference from subframes of the neighboring cell, and then groups these subframes into one set and groups downlink subframes of the local cell that are subject to only codirectional interference from subframes of the neighboring cell into another set. The base station device notifies the user equipment of configurations of the downlink subframe sets by using higher layer signaling.

According to an existing aperiodic CSI reference resource configuration rule, there may be a case in which aperiodic CSI of a corresponding downlink subframe set cannot be effectively reported because there is no aperiodic CSI reference resource in the downlink subframe set. For example, a base station device groups subframes into a first downlink subframe set and a second downlink subframe set, and aperiodic CSI of the first downlink subframe set cannot be effectively reported. Therefore, in this embodiment, aperiodic CSI measurement is performed on a set reference subframe (that is, a first reference subframe). The determining unit 31 first needs to determine a reference subframe, where the reference subframe is a subframe in the first downlink subframe set. The reference subframe may be determined in multiple manners, for example, may be determined according to an instruction notification, or may be selected by the user equipment, or may be determined according to a preset rule on which the base station device and the user equipment agree, which is not limited herein.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

Further, the first reference subframe is determined according to a subframe on which a periodic CSI reference resource is located. Preferably, it is determined that the first reference subframe is the same as the subframe on which the periodic CSI reference resource is located. In other words, it is determined that the first reference subframe is the same as a second reference subframe, where the second reference subframe is a subframe on which a periodic CSI reference resource is located, that is, the user equipment performs periodic CSI measurement on the second reference subframe, a periodic CSI measurement result on the second reference subframe is a periodic CSI measurement result of the first downlink subframe set, and the second reference subframe is a subframe in the first downlink subframe set. In this way, a restriction on a minimum UE capability required in a process of performing aperiodic CSI measurement and periodic CSI measurement by the UE is lowered.

A measurement unit 32, configured to perform aperiodic channel state information CSI measurement on the first reference subframe.

The measurement unit 32 may perform aperiodic CSI measurement on the reference subframe in an existing measurement manner, which is not described herein.

A sending unit 33, configured to send at least one piece of aperiodic CSI to a base station device, where the at least one piece of aperiodic CSI information corresponds to an aperiodic CSI measurement result on the first reference subframe, where the aperiodic CSI measurement result on the first reference subframe is an aperiodic CSI measurement result of a first downlink subframe set, and the first reference subframe is a subframe in the first downlink subframe set.

In this embodiment, an aperiodic CSI measurement result on the reference subframe is used as an aperiodic CSI measurement result of the first downlink subframe set; the sending unit 33 sends one or more pieces of aperiodic CSI to the base station device by using one or more uplink subframes; and the base station device receives the one or more pieces of aperiodic CSI sent by the sending unit 33, thereby ensuring that the reported aperiodic CSI of the first downlink subframe set is effectively received.

It can be seen that according to user equipment provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set.

Figure 8:
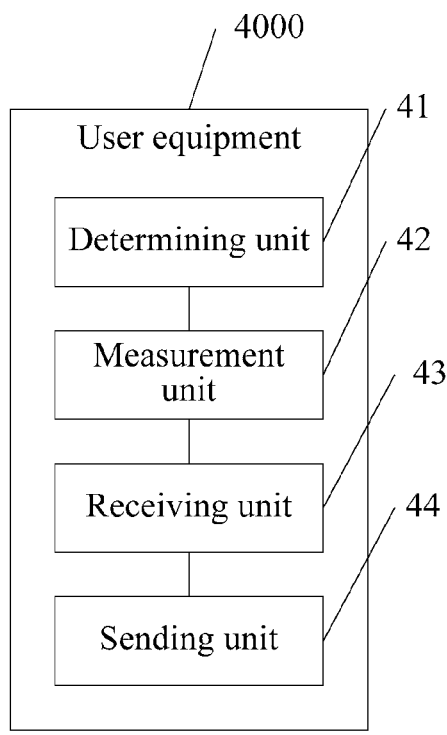
FIG. 8 is a schematic structural diagram of another user equipment according to an embodiment of the present invention.

Refer to FIG. 8, which is a schematic structural diagram of another user equipment according to an embodiment of the present invention. The user equipment 4000 includes:

A determining unit 41, configured to determine a first reference subframe.

A manner for determining the reference subframe by the determining unit 41 is described in detail in the following implementation manners.

A measurement unit 42, configured to perform aperiodic channel state information CSI measurement on the first reference subframe.

A receiving unit 43, configured to receive, on a first downlink subframe, aperiodic CSI triggering signaling sent by a base station device, where the aperiodic CSI triggering signaling is used to instruct the user equipment to send an aperiodic CSI measurement result of a first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among at least one piece of aperiodic CSI.

In this embodiment, the base station device triggers, on a downlink subframe of a radio frame, the user equipment to perform aperiodic CSI reporting, and the user equipment performs aperiodic CSI reporting on an uplink subframe of the radio frame; a reference subframe for aperiodic CSI measurement should be located between the triggering subframe and the fourth subframe prior to the reporting subframe, and when a subframe between the triggering subframe and the fourth subframe prior to the reporting subframe does not include a downlink subframe set obtained through grouping by the base station device, aperiodic CSI of the downlink subframe set cannot be effectively reported. Herein, the triggering subframe is the first downlink subframe, and the reporting subframe is the first uplink subframe. The receiving unit 43 receives, on the first downlink subframe, aperiodic CSI triggering signaling sent by the base station device, so as to trigger the user equipment to perform aperiodic CSI measurement on the reference subframe and report an aperiodic CSI measurement result on the uplink subframe.

A sending unit 44, configured to send at least one piece of aperiodic CSI to the base station device, where the at least one piece of aperiodic CSI information corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

A function of the sending unit 44 is the same as the function of the sending unit 33 in the embodiment shown in FIG. 7, and is not described herein.

The following introduces several implementation manners for determining the reference subframe.

In an implementation manner, the receiving unit 43 is further configured to receive first signaling sent by the base station device, where the first signaling is used to indicate the first reference subframe; and the determining unit 41 is specifically configured to determine the first reference subframe according to the first signaling.

For a CSI reference subframe in a first subframe set, the base station device notifies the UE by using higher layer signaling, and notifies the UE of no more than one CSI reference subframe within each radio frame, thereby lowering a restriction on a minimum UE capability required in a process of performing aperiodic CSI measurement by the UE. In the prior art, as shown in FIG. 2, a CSI reference resource corresponding to aperiodic CSI reported on a subframe 12 may be located on a subframe 4, and a CSI reference resource corresponding to aperiodic CSI reported on a subframe 7 may be located on a subframe 9. This leads to a problem, that is, measurement needs to be performed in advance before aperiodic CSI reporting is triggered. Consequently, within each radio frame, CSI measurement needs to be performed multiple times. Not knowing on which subframe the base station device triggers aperiodic CSI measurement, the UE needs to perform measurement on the subframes 4 and 9 of each radio frame, so as to prepare for reporting of corresponding CSI information. Therefore, if the base station does not perform aperiodic CSI triggering, the UE performs measurement, which may be unnecessary, within each radio frame.

As shown in FIG. 5, the base station notifies, by using higher layer signaling, the UE that within each radio frame, a reference subframe for aperiodic CSI is fixed at the subframe 4. Regardless of which position an aperiodic CSI triggering subframe is located at, where in this example, a triggering position may be a downlink subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

In another implementation manner, the receiving unit 43 is further configured to receive second signaling sent by the base station device, where the second signaling is used to indicate a preset rule; and the determining unit 41 is specifically configured to determine the first reference subframe according to the preset rule, where the preset rule includes:

the first reference subframe is a subframe whose subframe index is the largest in the first downlink subframe set; or the first reference subframe is a subframe whose subframe index is the smallest in the first downlink subframe set.

For an aperiodic CSI reference subframe in the first subframe set, a predefined rule is used and measurement is performed on only one aperiodic CSI reference resource within each radio frame, so that a restriction on a minimum UE capability required in a process of performing aperiodic CSI measurement by the UE is lowered. The aperiodic CSI reference subframe may correspond to multiple pieces of reported aperiodic CSI.

The predefined rule may be that the predefined CSI reference subframe is, a set of downlink subframes corresponding to a same type of CSI reporting are sorted according to subframe indexes, and a subframe whose subframe index is the largest or whose subframe index is the smallest is selected as the CSI reference subframe corresponding to a subframe set 2.

As shown in FIG. 5, according to downlink subframe grouping information sent by the base station device, information about downlink subframes (the subframes 4 and 9) included in the first subframe set can be obtained. Because the first subframe set has the foregoing aperiodic CSI reference subframe configuration problem, a CSI reference subframe corresponding to two possible aperiodic CSI triggering subframes needs to be determined, whether aperiodic CSI triggering is performed on the subframe 0 or the subframe 5. If sorting is performed according to subframe indexes and a subframe whose subframe index is the smallest is used as the CSI reference subframe corresponding to the subframe set 2, in this example, the subframe 4 is selected as a reference subframe in each radio frame; if a subframe whose subframe index is the largest is used as the CSI reference subframe corresponding to the subframe set 2, in this example, the subframe 9 is selected as a reference subframe in each radio frame.

If selection is performed according to the smallest subframe index, the subframe 4 is the reference subframe for aperiodic CSI. Regardless of which position an aperiodic triggering subframe is located at, where in this example, a triggering position may be a downlink subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

Figure 9:
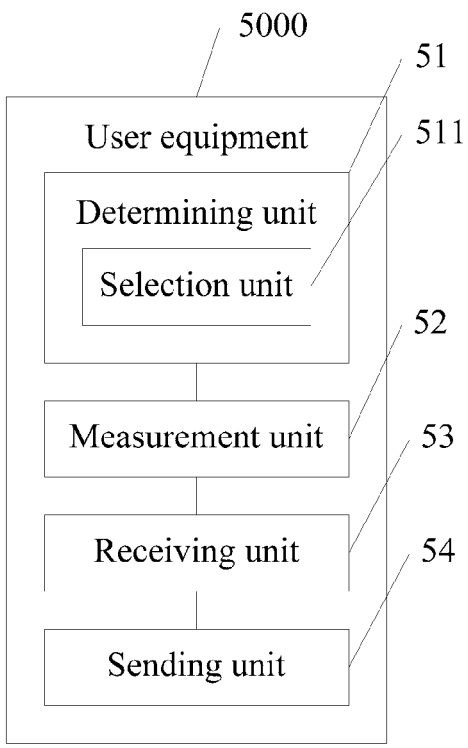
FIG. 9 is a schematic structural diagram of still another user equipment according to an embodiment of the present invention.

In still another implementation manner, referring to FIG. 9, which is a schematic structural diagram of still another user equipment according to an embodiment of the present invention, a determining unit 51 in the user equipment 5000 further includes a selection unit 511, where the selection unit 511 is configured to randomly select a subframe from the first downlink subframe set as a first reference subframe. Functions of other units in the user equipment 5000 are the same as or similar to functions of corresponding units in the embodiments shown in FIG. 7 and FIG. 8, and are not described herein.

For an aperiodic CSI reference subframe in a first subframe set, the UE selects, within each radio frame, a subframe that is in a same subframe set as a corresponding reporting subframe set as a CSI reference subframe, thereby lowering a restriction on a minimum UE capability required in a process of performing aperiodic CSI measurement by the UE.

As shown in FIG. 6, the UE may flexibly select a subframe 4 or a subframe 9 as a reference subframe for aperiodic CSI. Therefore, by using this method, a minimum requirement on the UE can be effectively lowered, so that within each radio frame, the UE can report, by updating CSI measurement information only once, aperiodic CSI measurement information that is obtained through measurement on the radio frame or a previous radio frame and corresponds to a latest first subframe set during aperiodic CSI reporting.

Because there is no fixed CSI reference subframe in this embodiment, after receiving corresponding reported aperiodic CSI, the base station device does not specify a specific CSI reference subframe configuration, but the base station device may determine that content included in the aperiodic CSI is a result obtained through corresponding measurement on downlink subframes in first subframe sets in two latest radio frames.

It can be seen that according to user equipment provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set; the reference subframe may be determined according to an instruction notification, or may be selected by the user equipment, or may be determined according to a preset rule on which the base station device and the user equipment agree, and an implementation process is easy and convenient.

Figure 10:
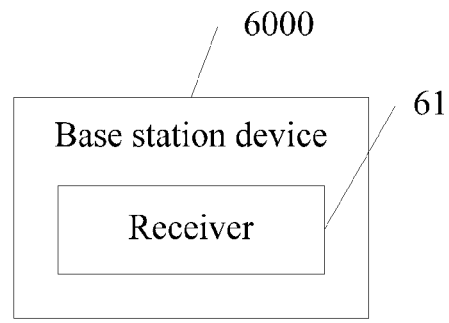
FIG. 10 is a schematic structural diagram of still another base station device according to an embodiment of the present invention.

Refer to FIG. 10, which is a schematic structural diagram of still another base station device according to an embodiment of the present invention. The base station device 6000 includes:

a receiver 61, configured to receive at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set.

In this embodiment, for example, dynamic TDD subframe configuration is used in an LTE system, changes in subframe configurations of a local cell and a neighboring cell may be different, and the neighboring cell may cause codirectional interference or contradirectional interference to the local cell. According to a subframe configuration of the neighboring cell, a base station device of the local cell can determine which downlink subframes of the local cell may be subject to contradirectional interference from subframes of the neighboring cell, and then groups these subframes into one set and groups downlink subframes of the local cell that are subject to only codirectional interference from subframes of the neighboring cell into another set. The base station device notifies the user equipment of configurations of the downlink subframe sets by using higher layer signaling. It should be noted that higher layer signaling is signaling that is sent from a higher layer and is received more slowly relative to physical layer signaling, and includes RRC signaling, MAC signaling, and the like.

According to an existing aperiodic CSI reference resource configuration rule, there may be a case in which aperiodic CSI of a corresponding downlink subframe set cannot be effectively reported because there is no aperiodic CSI reference resource in the downlink subframe set. For example, a base station device groups subframes into a first downlink subframe set and a second downlink subframe set, and aperiodic CSI of the first downlink subframe set cannot be effectively reported. Therefore, in this embodiment, aperiodic CSI measurement is performed on a set reference subframe (that is, a first reference subframe), where the reference subframe is a subframe in the first downlink subframe set, and an aperiodic CSI measurement result on the reference subframe is used as an aperiodic CSI measurement result of the first downlink subframe set. The user equipment sends one or more pieces of aperiodic CSI to the base station device by using one or more uplink subframes; the receiver 61 receives the one or more pieces of aperiodic CSI sent by the user equipment, thereby ensuring that the reported aperiodic CSI of the first downlink subframe set is effectively received.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

Further, the first reference subframe is set according to a subframe on which a periodic CSI reference resource is located. Preferably, the first reference subframe is set to be the same as the subframe on which the periodic CSI reference resource is located. In other words, the first reference subframe is set to be the same as a second reference subframe, where the second reference subframe is a subframe on which a periodic CSI reference resource is located, that is, the user equipment performs periodic CSI measurement on the second reference subframe, a periodic CSI measurement result on the second reference subframe is a periodic CSI measurement result of the first downlink subframe set, and the second reference subframe is a subframe in the first downlink subframe set. In this way, a restriction on a minimum UE capability required in a process of performing aperiodic CSI measurement and periodic CSI measurement by the UE is lowered.

For implementation of a specific function of the receiver 61, refer to the description of the foregoing embodiment.

It can be seen that according to a base station device provided in this embodiment of the present invention, a base station device receives a result of aperiodic CSI measurement, which is performed by user equipment on a set reference subframe in a downlink subframe set. In this way, it can be ensured that the base station device effectively receives the aperiodic channel state measurement result, which is sent by the user equipment, of the downlink subframe set.

Figure 11:
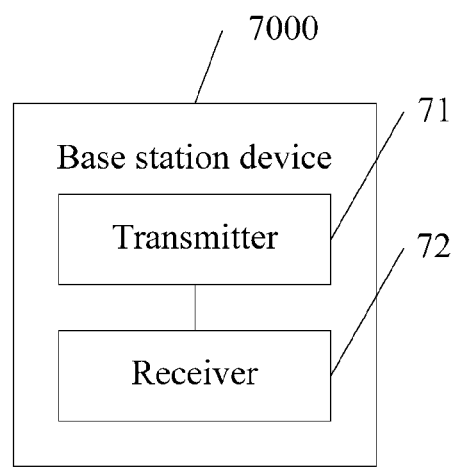
FIG. 11 is a schematic structural diagram of still another base station device according to an embodiment of the present invention.

Refer to FIG. 11, which is a schematic structural diagram of still another base station device according to an embodiment of the present invention. The base station device 7000 includes:

A transmitter 71, configured to send aperiodic CSI triggering signaling to user equipment on a first downlink subframe, where the aperiodic CSI triggering signaling is used to instruct the user equipment to send an aperiodic CSI measurement result of a first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among at least one piece of aperiodic CSI.

In this embodiment, the base station device triggers, on a downlink subframe of a radio frame, the user equipment to perform aperiodic CSI reporting, and the user equipment performs aperiodic CSI reporting on an uplink subframe of the radio frame; a reference subframe for aperiodic CSI measurement should be located between the triggering subframe and the fourth subframe prior to the reporting subframe, and when a subframe between the triggering subframe to the fourth subframe prior to the reporting subframe does not include a downlink subframe set obtained through grouping by the base station device, aperiodic CSI of the downlink subframe set cannot be effectively reported. Herein, the triggering subframe is the first downlink subframe, and the reporting subframe is the first uplink subframe.

In an implementation manner, the transmitter 71 is further configured to send first signaling to the user equipment, where the first signaling is used to indicate a first reference subframe.

In another implementation manner, the first reference subframe is a subframe randomly selected by the user equipment from the first downlink subframe set.

In still another implementation manner, the first reference subframe is a subframe determined by the user equipment according to a preset rule in the first downlink subframe set, where the preset rule includes:

the first reference subframe is a subframe whose subframe index is the largest in the first downlink subframe set; or the first reference subframe is a subframe whose subframe index is the smallest in the first downlink subframe set; and the transmitter 71 is further configured to send second signaling to the user equipment, where the second signaling is used to indicate the preset rule.

A receiver 72, configured to receive the at least one piece of aperiodic channel state information CSI sent by the user equipment, where the at least one piece of aperiodic CSI corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

When determining that a subframe between the triggering subframe and the fourth subframe prior to the reporting subframe does not include any subframe in the first downlink subframe set, the user equipment performs aperiodic CSI measurement on a set reference subframe, where the reference subframe is a subframe in the first downlink subframe set, and uses an aperiodic CSI measurement result on the reference subframe as an aperiodic CSI measurement result of the first downlink subframe set. The user equipment sends one or more pieces of aperiodic CSI to the base station device by using one or more uplink subframes; the receiver 72 receives the one or more pieces of aperiodic CSI sent by the user equipment, thereby ensuring that the reported aperiodic CSI of the first downlink subframe set is effectively received.

For implementation of specific functions of the transmitter 71 and the receiver 72, refer to the description of the foregoing embodiment.

It can be seen that according to a base station device provided in this embodiment of the present invention, a base station device receives a result of aperiodic CSI measurement, which is performed by user equipment on a set reference subframe in a downlink subframe set. In this way, it can be ensured that the base station device effectively receives the aperiodic channel state measurement result, which is sent by the user equipment, of the downlink subframe set; the reference subframe may be determined according to an instruction notification, or may be selected by the user equipment, or may be determined according to a preset rule on which the base station device and the user equipment agree, and an implementation process is easy and convenient.

Figure 12:
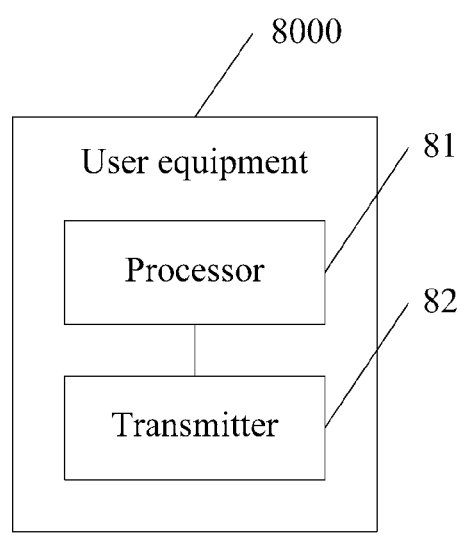
FIG. 12 is a schematic structural diagram of still another user equipment according to an embodiment of the present invention.

Refer to FIG. 12, which is a schematic structural diagram of still another user equipment according to an embodiment of the present invention. The user equipment 8000 includes:

A processor 81, configured to determine a first reference subframe.

In this embodiment, for example, dynamic TDD subframe configuration is used in an LTE system, changes in subframe configurations of a local cell and a neighboring cell may be different, and the neighboring cell may cause codirectional interference or contradirectional interference to the local cell. According to a subframe configuration of the neighboring cell, a base station device of the local cell can determine which downlink subframes of the local cell may be subject to contradirectional interference from subframes of the neighboring cell, and then groups these subframes into one set and groups downlink subframes of the local cell that are subject to only codirectional interference from subframes of the neighboring cell into another set. The base station device notifies the user equipment of configurations of the downlink subframe sets by using higher layer signaling.

According to an existing aperiodic CSI reference resource configuration rule, there may be a case in which aperiodic CSI of a corresponding downlink subframe set cannot be effectively reported because there is no aperiodic CSI reference resource in the downlink subframe set. For example, a base station device groups subframes into a first downlink subframe set and a second downlink subframe set, and aperiodic CSI of the first downlink subframe set cannot be reported effectively. Therefore, in this embodiment, aperiodic CSI measurement is performed on a set reference subframe (that is, a first reference subframe). The processor 81 first needs to determine a reference subframe, where the reference subframe is a subframe in the first downlink subframe set. The reference subframe may be determined in multiple manners, for example, may be determined according to an instruction notification, or may be selected by the user equipment, or may be determined according to a preset rule on which the base station device and the user equipment agree, which is not limited herein.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

Further, the first reference subframe is determined according to a subframe on which a periodic CSI reference resource is located. Preferably, it is determined that the first reference subframe is the same as the subframe on which the periodic CSI reference resource is located. In other words, it is determined that the first reference subframe is the same as a second reference subframe, where the second reference subframe is a subframe on which a periodic CSI reference resource is located, that is, the user equipment performs periodic CSI measurement on the second reference subframe, a periodic CSI measurement result on the second reference subframe is a periodic CSI measurement result of the first downlink subframe set, and the second reference subframe is a subframe in the first downlink subframe set. In this way, a restriction on a minimum UE capability required in a process of performing aperiodic CSI measurement and periodic CSI measurement by the UE is lowered.

The processor 81 is further configured to perform aperiodic channel state information CSI measurement on the first reference subframe.

The processor 81 may perform aperiodic CSI measurement on the reference subframe in an existing measurement manner, which is not described herein.

A transmitter 82, configured to send at least one piece of aperiodic CSI to a base station device, where the at least one piece of aperiodic CSI information corresponds to an aperiodic CSI measurement result on the first reference subframe, where the aperiodic CSI measurement result on the first reference subframe is an aperiodic CSI measurement result of a first downlink subframe set, and the first reference subframe is a subframe in the first downlink subframe set.

In this embodiment, an aperiodic CSI measurement result on the reference subframe is used as an aperiodic CSI measurement result of the first downlink subframe set; the transmitter 82 sends one or more pieces of aperiodic CSI to the base station device by using one or more uplink subframes; and the base station device receives the one or more pieces of aperiodic CSI sent by the transmitter 82, thereby ensuring that the reported aperiodic CSI of the first downlink subframe set is effectively received.

For implementation of specific functions of the processor 81 and the transmitter 82, reference may be made to the description of the foregoing embodiment.

It can be seen that according to user equipment provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set.

Refer to FIG. 13, which is a schematic structural diagram of still another user equipment according to an embodiment of the present invention. The user equipment 9000 includes:

A receiver 91, configured to receive, on a first downlink subframe, aperiodic CSI triggering signaling sent by a base station device, where the aperiodic CSI triggering signaling is used to instruct the user equipment to send an aperiodic CSI measurement result of a first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among at least one piece of aperiodic CSI.

In this embodiment, the base station device triggers, on a downlink subframe of a radio frame, the user equipment to perform aperiodic CSI reporting, and the user equipment performs aperiodic CSI reporting on an uplink subframe of the radio frame; a reference subframe for aperiodic CSI measurement should be located between the triggering subframe and the fourth subframe prior to the reporting subframe, and when a subframe between the triggering subframe and the fourth subframe prior to the reporting subframe does not include a downlink subframe set obtained through grouping by the base station device, aperiodic CSI of the downlink subframe set cannot be effectively reported. Herein, the triggering subframe is the first downlink subframe, and the reporting subframe is the first uplink subframe. The receiver 91 receives, on the first downlink subframe, aperiodic CSI triggering signaling sent by the base station device, so as to trigger the user equipment to perform aperiodic CSI measurement on the reference subframe and report an aperiodic CSI measurement result on the uplink subframe.

In an implementation manner, the receiver 91 is further configured to receive first signaling sent by the base station device, where the first signaling is used to indicate a first reference subframe.

In another implementation manner, the receiver 91 is further configured to receive second signaling sent by the base station device, where the second signaling is used to indicate a preset rule.

A processor 92, configured to determine the first reference subframe.

The processor 92 is further configured to perform aperiodic channel state information CSI measurement on the first reference subframe.

In still another implementation manner, the step of determining a first reference subframe performed by the processor 92 includes: determining the first reference subframe according to the first signaling.

In still another implementation manner, the step of determining a first reference subframe performed by the processor 92 includes: randomly selecting a subframe from the first downlink subframe set as the first reference subframe.

In still another implementation manner, the step of determining a first reference subframe performed by the processor 92 includes: determining the first reference subframe according to a preset rule, where the preset rule includes:

the first reference subframe is a subframe whose subframe index is the largest in the first downlink subframe set; or the first reference subframe is a subframe whose subframe index is the smallest in the first downlink subframe set.

A transmitter 93, configured to send at least one piece of aperiodic CSI to the base station device, where the at least one piece of aperiodic CSI information corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

It can be seen that according to user equipment provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set; the reference subframe may be determined according to an instruction notification, or may be selected by the user equipment, or may be determined according to a preset rule on which the base station device and the user equipment agree, and an implementation process is easy and convenient.

Refer to FIG. 14, which is a flowchart of a method for reporting channel state information according to an embodiment of the present invention. The method includes the following steps:

Step S101: Receive at least one piece of aperiodic channel state information CSI sent by user equipment, where the at least one piece of aperiodic CSI corresponds to an aperiodic CSI measurement result on a first reference subframe, where the aperiodic CSI measurement result on the first reference subframe is an aperiodic CSI measurement result of a first downlink subframe set, and the first reference subframe is a subframe in the first downlink subframe set.

In this embodiment, for example, dynamic TDD subframe configuration is used in an LTE system, changes in subframe configurations of a local cell and a neighboring cell may be different, and the neighboring cell may cause codirectional interference or contradirectional interference to the local cell. According to a subframe configuration of the neighboring cell, a base station device of the local cell can determine which downlink subframes of the local cell may be subject to contradirectional interference from subframes of the neighboring cell, and then groups these subframes into one set and groups downlink subframes of the local cell that are subject to only codirectional interference from subframes of the neighboring cell into another set. The base station device notifies the user equipment of configurations of the downlink subframe sets by using higher layer signaling. It should be noted that higher layer signaling is signaling that is sent from a higher layer and is received more slowly relative to physical layer signaling, and includes RRC signaling, MAC signaling, and the like According to an existing aperiodic CSI reference resource configuration rule, there may be a case in which aperiodic CSI of a corresponding downlink subframe set cannot be effectively reported because there is no aperiodic CSI reference resource in the downlink subframe set. For example, a base station device groups subframes into a first downlink subframe set and a second downlink subframe set, and aperiodic CSI of the first downlink subframe set cannot be effectively reported. Therefore, in this embodiment, aperiodic CSI measurement is performed on a set reference subframe (that is, a first reference subframe), where the reference subframe is a subframe in the first downlink subframe set, and an aperiodic CSI measurement result on the reference subframe is used as an aperiodic CSI measurement result of the first downlink subframe set. The user equipment sends one or more pieces of aperiodic CSI to the base station device by using one or more uplink subframes; the base station device receives the one or more pieces of aperiodic CSI sent by the user equipment, thereby ensuring that the reported aperiodic CSI of the first downlink subframe set is effectively received.

The reference subframe may be determined according to an instruction notification, or may be selected by the user equipment, or may be determined according to a preset rule on which the base station device and the user equipment agree. As for the manners of performing determining according to an instruction notification and a preset rule, detailed description is made in the following embodiment; as for the manner for selection by the user equipment, the user equipment randomly selects a subframe from the first downlink subframe set. For an aperiodic CSI reference subframe in a first subframe set, the UE selects, within each radio frame, a subframe that is in a same subframe set as a corresponding reporting subframe set as a CSI reference subframe, thereby lowering a restriction on a minimum UE capability required in a process of performing aperiodic CSI measurement by the UE. As shown in FIG. 6, the UE may flexibly select a subframe 4 or a subframe 9 as a reference subframe for aperiodic CSI. Therefore, by using this method, a minimum requirement on the UE can be effectively lowered, so that within each radio frame, the UE can report, by updating CSI measurement information only once, aperiodic CSI measurement information that is obtained through measurement on the radio frame or a previous radio frame and corresponds to a latest first subframe set during aperiodic CSI reporting. Because there is no fixed CSI reference subframe in this embodiment, after receiving corresponding reported aperiodic CSI, the base station device does not specify a specific CSI reference subframe configuration, but the base station device may determine that content included in the aperiodic CSI is a result obtained through corresponding measurement on downlink subframes in first subframe sets in two latest radio frames.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

It can be seen that according to a method for reporting channel state information provided in this embodiment of the present invention, a base station device receives a result of aperiodic CSI measurement, which is performed by user equipment on a set reference subframe in a downlink subframe set. In this way, it can be ensured that the base station device effectively receives the aperiodic channel state measurement result, which is sent by the user equipment, of the downlink subframe set.

Figure 15:
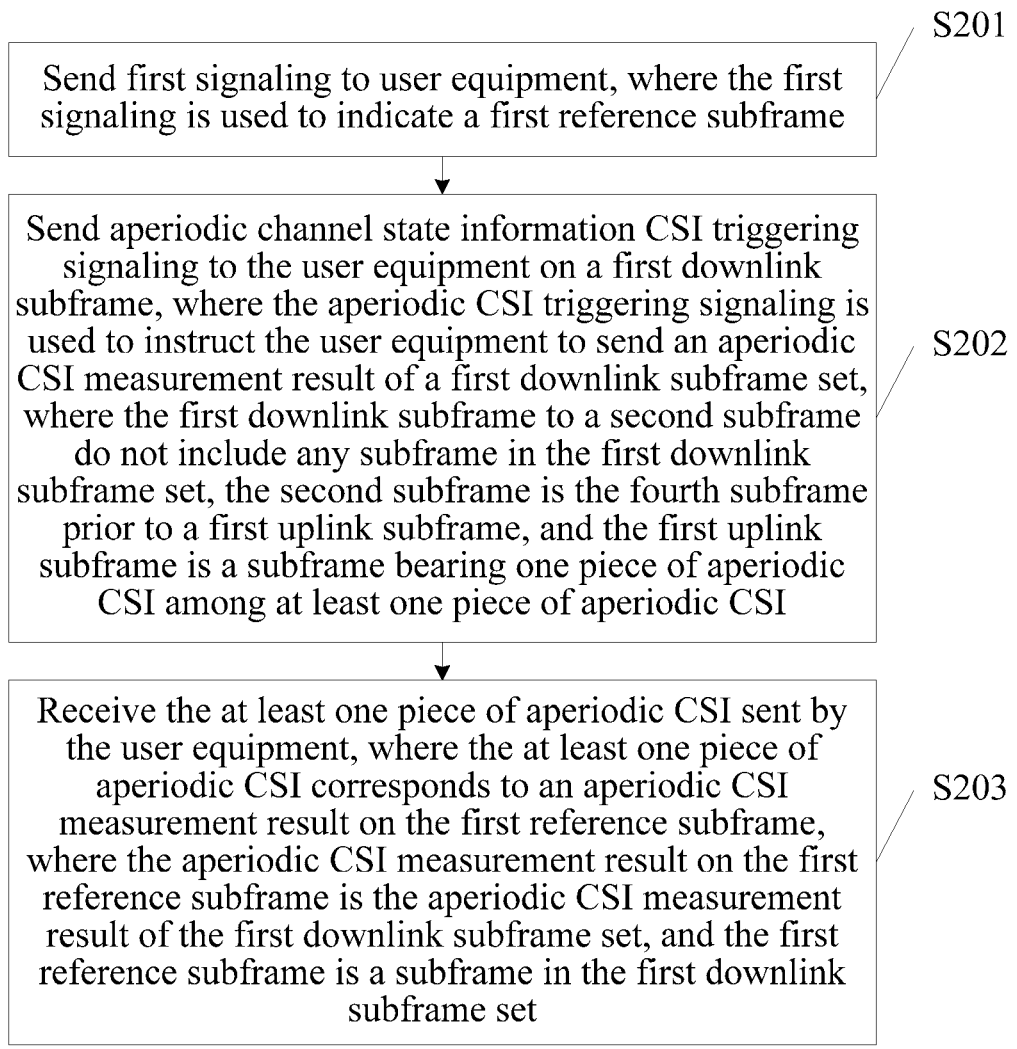
FIG. 15 is a flowchart of another method for reporting channel state information according to an embodiment of the present invention.

Refer to FIG. 15, which is a flowchart of another method for reporting channel state information according to an embodiment of the present invention. The method includes the following steps:

Step S201: Send first signaling to user equipment, where the first signaling is used to indicate a first reference subframe.

For a CSI reference subframe in a first subframe set, the base station device notifies the UE by using higher layer signaling, and notifies the UE of no more than one CSI reference subframe within each radio frame, thereby lowering a restriction on a minimum UE capability required in a process of performing aperiodic CSI measurement by the UE. In the prior art, as shown in FIG. 2, a CSI reference resource corresponding to aperiodic CSI reported on a subframe 12 may be located on a subframe 4, and a CSI reference resource corresponding to aperiodic CSI reported on a subframe 7 may be located on a subframe 9. This leads to a problem, that is, measurement needs to be performed in advance before aperiodic CSI reporting is triggered. Consequently, within each radio frame, CSI measurement needs to be performed multiple times. Not knowing on which subframe the base station device triggers aperiodic CSI measurement, the UE needs to perform measurement on the subframes 4 and 9 of each radio frame, so as to prepare for reporting of corresponding CSI information. Therefore, if the base station does not perform aperiodic CSI triggering, the UE performs measurement, which may be unnecessary, within each radio frame.

As shown in FIG. 5, the base station notifies, by using higher layer signaling, the UE that within each radio frame, a reference subframe for aperiodic CSI is fixed at the subframe 4. Regardless of which position an aperiodic CSI triggering subframe is located at, where in this example, a triggering position may be a downlink subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

Step S202: Send aperiodic CSI triggering signaling to the user equipment on a first downlink subframe, where the aperiodic CSI triggering signaling is used to instruct the user equipment to send an aperiodic CSI measurement result in a first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among at least one piece of aperiodic CSI. For example, the first downlink subframe set includes the subframes 4 and 9, the first downlink subframe is the subframe 0, the first uplink subframe is the subframe 7, the second subframe is a subframe 3, and subframes between the first downlink subframe and the second subframe include the subframes 0, 1, 2, and 3 and do not include any subframe in the first downlink subframe set.

In this embodiment, the base station device triggers, on a downlink subframe of a radio frame, the user equipment to perform aperiodic CSI reporting, and the user equipment performs aperiodic CSI reporting on an uplink subframe of the radio frame; a reference subframe for aperiodic CSI measurement should be located between the triggering subframe and the fourth subframe prior to the reporting subframe, and when a subframe between the triggering subframe and the fourth subframe prior to the reporting subframe does not include a downlink subframe set obtained through grouping by the base station device, aperiodic CSI of the downlink subframe set cannot be effectively reported. Herein, the triggering subframe is the first downlink subframe, and the reporting subframe is the first uplink subframe.

Step S203: Receive the at least one piece of aperiodic CSI sent by the user equipment, where the at least one piece of aperiodic CSI corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

When determining that a subframe between the triggering subframe and the fourth subframe prior to the reporting subframe does not include any subframe in the first downlink subframe set, the user equipment performs aperiodic CSI measurement on a set reference subframe, where the reference subframe is a subframe in the first downlink subframe set, and uses an aperiodic CSI measurement result on the reference subframe as an aperiodic CSI measurement result of the first downlink subframe set; the user equipment sends one or more pieces of aperiodic CSI to the base station device by using one or more uplink subframes; and the receiving unit 22 of the base station device receives the one or more pieces of aperiodic CSI sent by the user equipment, thereby ensuring that the reported aperiodic CSI of the first downlink subframe set is effectively received.

It can be seen that according to a method for reporting channel state information provided in this embodiment of the present invention, a base station device receives a result of aperiodic CSI measurement, which is performed by user equipment on a set reference subframe in a downlink subframe set. In this way, it can be ensured that the base station device effectively receives the aperiodic channel state measurement result, which is sent by the user equipment, of the downlink subframe set; the reference subframe may be determined according to an instruction notification, and an implementation process is easy and convenient.

Figure 16:
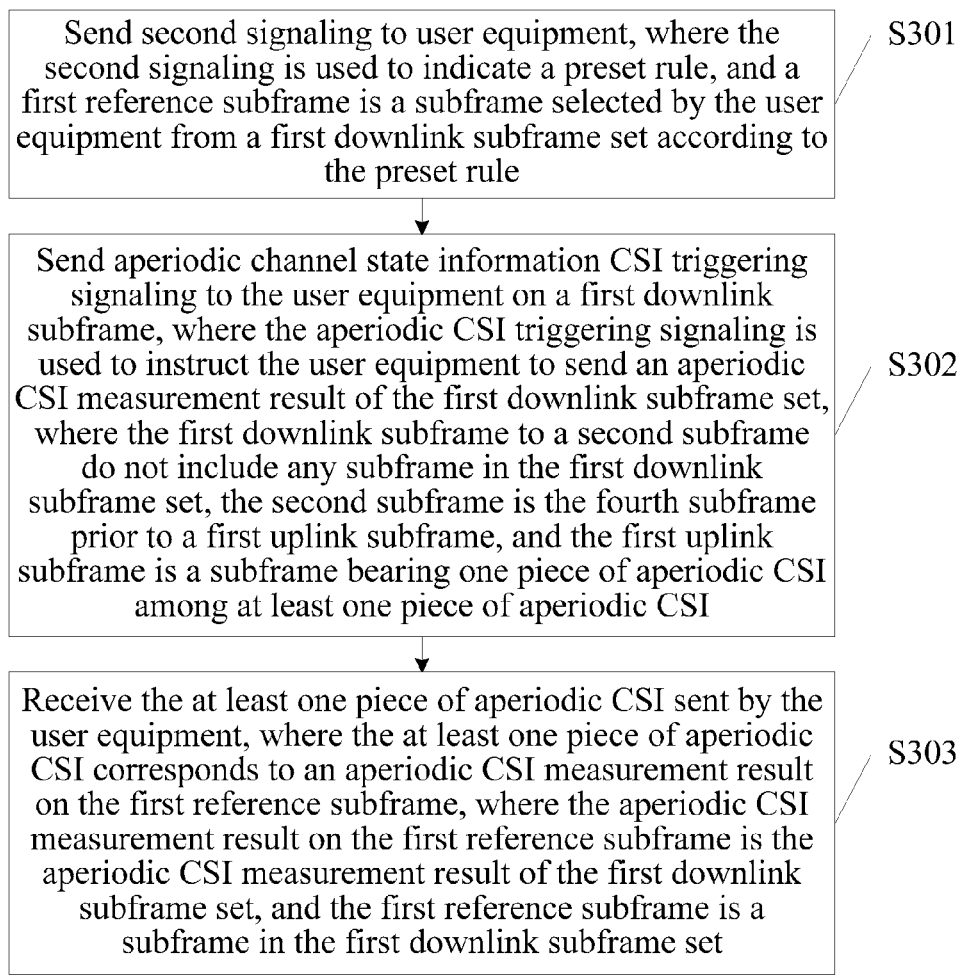
FIG. 16 is a flowchart of still another method for reporting channel state information according to an embodiment of the present invention.

Refer to FIG. 16, which is a flowchart of still another method for reporting channel state information according to an embodiment of the present invention. The method includes the following steps:

Step S301: Send second signaling to user equipment, where the second signaling is used to indicate a preset rule, and a first reference subframe is a subframe selected by the user equipment from a first downlink subframe set according to the preset rule.

For an aperiodic CSI reference subframe in a first subframe set, a predefined rule is used and measurement is performed on only one aperiodic CSI reference resource within each radio frame, so that a restriction on a minimum UE capability required in a process of performing aperiodic CSI measurement by the UE is lowered. The aperiodic CSI reference subframe may correspond to multiple pieces of reported aperiodic CSI.

The predefined rule may be that the predefined CSI reference subframe is, a set of downlink subframes corresponding to a same type of CSI reporting are sorted according to subframe indexes (subframe index), and a subframe whose subframe index is the largest or whose subframe index is the smallest is selected as the CSI reference subframe corresponding to subframe set 2.

As shown in FIG. 5, according to downlink subframe grouping information sent by the base station device, information about downlink subframes (subframes 4 and 9) included in the first subframe set can be obtained. Because the first subframe set has the foregoing aperiodic CSI reference subframe configuration problem, a CSI reference subframe corresponding to two possible aperiodic CSI triggering subframes needs to be determined, whether aperiodic CSI triggering is performed on a subframe 0 or a subframe 5. If sorting is performed according to subframe indexes and a subframe whose subframe index is the smallest is used as the CSI reference subframe corresponding to a subframe set 2, in this example, the subframe 4 is selected as a reference subframe in each radio frame; if a subframe whose subframe index is the largest is used as the CSI reference subframe corresponding to the subframe set 2, in this example, the subframe 9 is selected as a reference subframe in each radio frame.

If selection is performed according to the smallest subframe index, the subframe 4 is the reference subframe for aperiodic CSI. Regardless of which position an aperiodic triggering subframe is located at, where in this example, a triggering position may be a downlink subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

Step S302: Send aperiodic CSI triggering signaling to the user equipment on a first downlink subframe, where the aperiodic CSI triggering signaling is used to instruct the user equipment to send an aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI among at least one piece of aperiodic CSI.

Step S303: Receive the at least one piece of aperiodic CSI sent by the user equipment, where the at least one piece of aperiodic CSI corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

Step S302 and step S303 are respectively the same as step S202 and step S203 in the embodiment shown in FIG. 15, and are not described herein.

It can be seen that according to a method for reporting channel state information provided in this embodiment of the present invention, a base station device receives a result of aperiodic CSI measurement, which is performed by user equipment on a set reference subframe in a downlink subframe set. In this way, it can be ensured that the base station device effectively receives the aperiodic channel state measurement result, which is sent by the user equipment, of the downlink subframe set; the reference subframe may be determined according to a preset rule on which the base station device and the user equipment agree, and an implementation process is easy and convenient.

Figure 17:
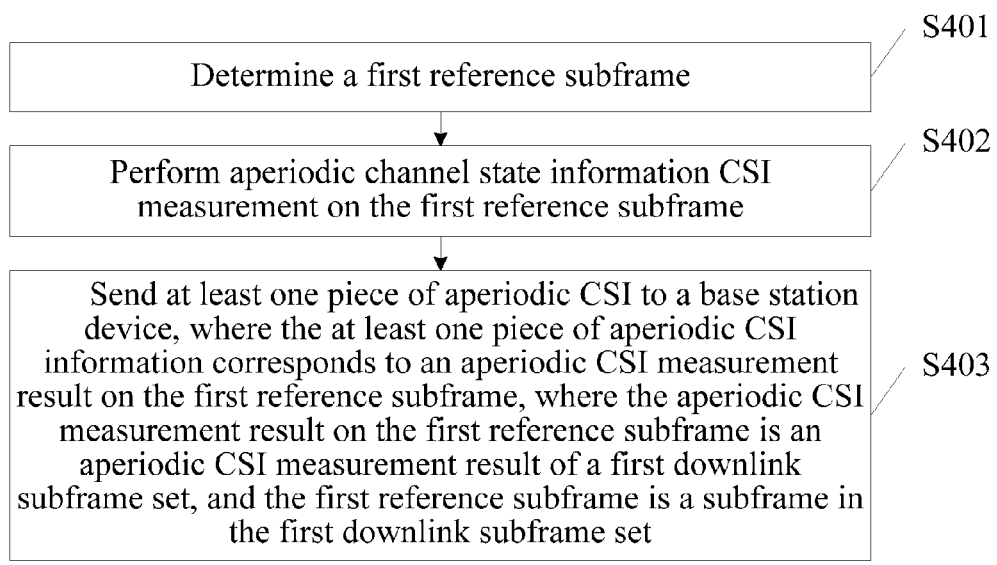
FIG. 17 is a flowchart of still another method for reporting channel state information according to an embodiment of the present invention.

Refer to FIG. 17, which is a flowchart of still another method for reporting channel state information according to an embodiment of the present invention. The method includes the following steps:

Step S401: Determine a first reference subframe.

In this embodiment, for example, dynamic TDD subframe configuration is used in an LTE system, changes in subframe configurations of a local cell and a neighboring cell may be different, and the neighboring cell may cause codirectional interference or contradirectional interference to the local cell. According to a subframe configuration of the neighboring cell, a base station device of the local cell can determine which downlink subframes of the local cell may be subject to contradirectional interference from subframes of the neighboring cell, and then groups these subframes into one set and groups downlink subframes of the local cell that are subject to only codirectional interference from subframes of the neighboring cell into another set. The base station device notifies the user equipment of configurations of the downlink subframe sets by using higher layer signaling.

According to an existing aperiodic CSI reference resource configuration rule, there may be a case in which aperiodic CSI of a corresponding downlink subframe set cannot be effectively reported because there is no aperiodic CSI reference resource in the downlink subframe set. For example, a base station device groups subframes into a first downlink subframe set and a second downlink subframe set, and aperiodic CSI of the first downlink subframe set cannot be effectively reported. Therefore, in this embodiment, aperiodic CSI measurement is performed on a set reference subframe (that is, a first reference subframe). In this step, a reference subframe needs to be determined first, where the reference subframe is a subframe in the first downlink subframe set. The reference subframe may be determined in multiple manners, for example, may be determined according to an instruction notification, or may be selected by the user equipment, or may be determined according to a preset rule on which the base station device and the user equipment agree, which is not limited herein.

It should be noted that when there is more than one subframe in the first downlink subframe set, a quantity of subframes that are set as first reference subframes is less than or equal to a quantity of subframes in the first downlink subframe set, that is, the user equipment does not need to perform CSI measurement on all downlink subframes in the first downlink subframe set. Alternatively, there is no more than one first reference subframe within one radio frame, that is, within one radio frame, the user equipment needs to perform CSI measurement of the first downlink subframe set only on no more than one downlink subframe.

Step S402: Perform aperiodic channel state information CSI measurement on the first reference subframe.

Aperiodic CSI measurement may be performed on the reference subframe in an existing measurement manner, which is not described herein.

Step S403: Send at least one piece of aperiodic CSI to a base station device, where the at least one piece of aperiodic CSI information corresponds to an aperiodic CSI measurement result on the first reference subframe, where the aperiodic CSI measurement result on the first reference subframe is an aperiodic CSI measurement result of a first downlink subframe set, and the first reference subframe is a subframe in the first downlink subframe set.

In this embodiment, an aperiodic CSI measurement result on the reference subframe is used as an aperiodic CSI measurement result of the first downlink subframe set; the user equipment sends one or more pieces of aperiodic CSI to the base station device by using one or more uplink subframes; and the base station device receives the one or more pieces of aperiodic CSI sent by the user equipment, thereby ensuring that the reported aperiodic CSI of the first downlink subframe set is effectively received.

It can be seen that according to a method for reporting channel state information provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set.

Figure 18:
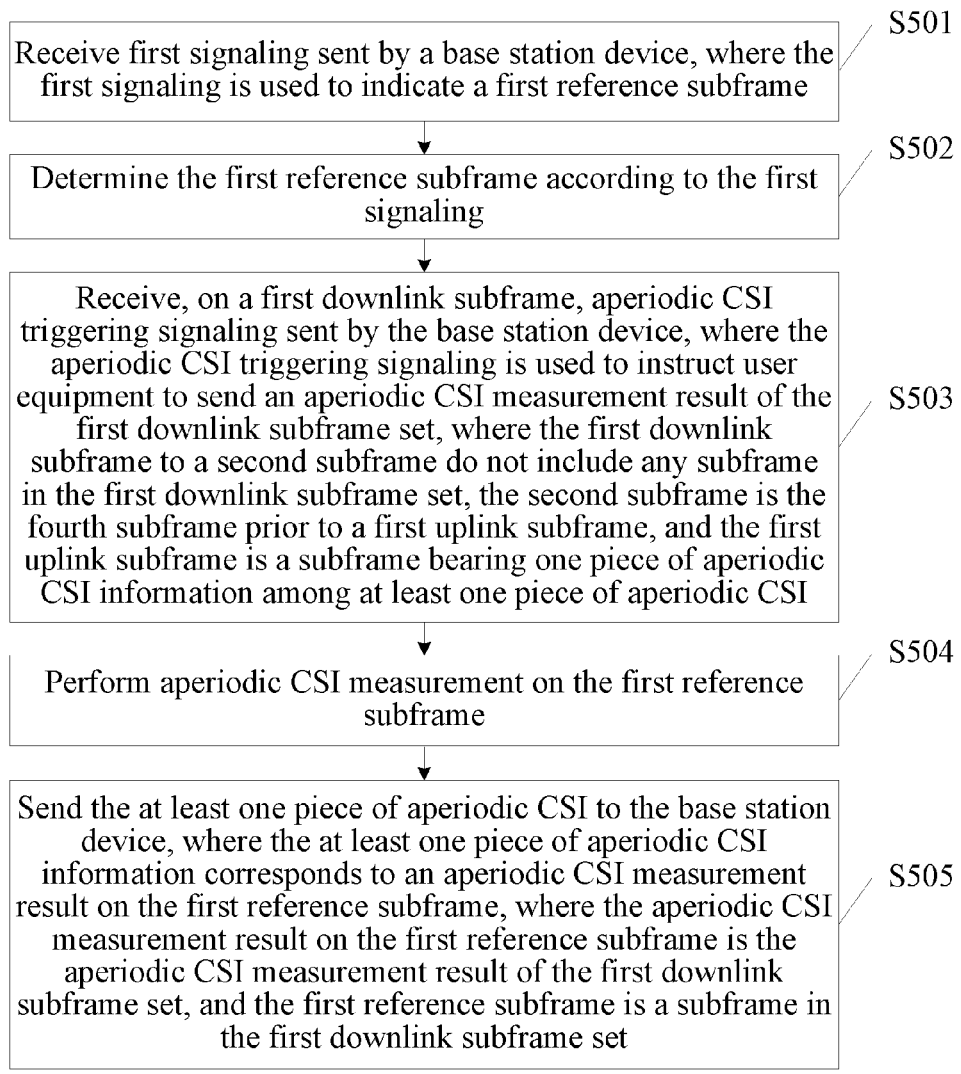
FIG. 18 is a flowchart of still another method for reporting channel state information according to an embodiment of the present invention.

Refer to FIG. 18, which is a flowchart of still another method for reporting channel state information according to an embodiment of the present invention. The method includes the following steps:

Step S501: Receive first signaling sent by a base station device, where the first signaling is used to indicate a first reference subframe.

Step S502: Determine the first reference subframe according to the first signaling.

For a CSI reference subframe in a first subframe set, the base station device notifies the UE by using higher layer signaling, and notifies the UE of no more than one CSI reference subframe within each radio frame, thereby lowering a restriction on a minimum UE capability required in a process of performing aperiodic CSI measurement by the UE. In the prior art, as shown in FIG. 2, a CSI reference resource corresponding to aperiodic CSI reported on a subframe 12 may be located on a subframe 4, and a CSI reference resource corresponding to aperiodic CSI reported on a subframe 7 may be located on a subframe 9. This leads to a problem, that is, measurement needs to be performed in advance before aperiodic CSI reporting is triggered. Consequently, within each radio frame, CSI measurement needs to be performed multiple times. Not knowing on which subframe the base station device triggers aperiodic CSI measurement, the UE needs to perform measurement on the subframes 4 and 9 of each radio frame, so as to prepare for reporting of corresponding CSI information. Therefore, if the base station does not perform aperiodic CSI triggering, the UE performs measurement, which may be unnecessary, within each radio frame.

As shown in FIG. 5, the base station notifies, by using higher layer signaling, the UE that within each radio frame, a reference subframe for aperiodic CSI is fixed at subframe 4. Regardless of which position an aperiodic CSI triggering subframe is located at, where in this example, a triggering position may be a downlink subframe 0 or 5, the UE reports a CSI measurement result on subframe 4. Specifically, when aperiodic CSI is triggered on a subframe 5, the UE reports a CSI measurement result on the subframe 4 in a current radio subframe; or when aperiodic CSI is triggered on a subframe 0, the UE reports a CSI measurement result on the subframe 4 in a previous radio subframe.

Step S503: Receive, on a first downlink subframe, aperiodic CSI triggering signaling sent by the base station device, where the aperiodic CSI triggering signaling is used to instruct user equipment to send an aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among at least one piece of aperiodic CSI.

In this embodiment, the base station device triggers, on a downlink subframe of a radio frame, the user equipment to perform aperiodic CSI reporting, and the user equipment performs aperiodic CSI reporting on an uplink subframe of the radio frame; a reference subframe for aperiodic CSI measurement should be located between the triggering subframe and the fourth subframe prior to the reporting subframe, and when a subframe between the triggering subframe and the fourth subframe prior to the reporting subframe does not include a downlink subframe set obtained through grouping by the base station device, aperiodic CSI of the downlink subframe set cannot be effectively reported. Herein, the triggering subframe is the first downlink subframe, and the reporting subframe is the first uplink subframe. The user equipment receives, on the first downlink subframe, aperiodic CSI triggering signaling sent by the base station device, so as to trigger the user equipment to perform aperiodic CSI measurement on the reference subframe and report an aperiodic CSI measurement result on the uplink subframe.

Step S504: Perform aperiodic CSI measurement on the first reference subframe.

Step S505: Send the at least one piece of aperiodic CSI to the base station device, where the at least one piece of aperiodic CSI information corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

Step S504 and step S505 are respectively the same as step S402 and step S403 in the embodiment shown in FIG. 17, and are not described herein.

It can be seen that according to a method for reporting channel state information provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set; the reference subframe may be determined according to an instruction notification, and an implementation process is easy and convenient.

Figure 19:
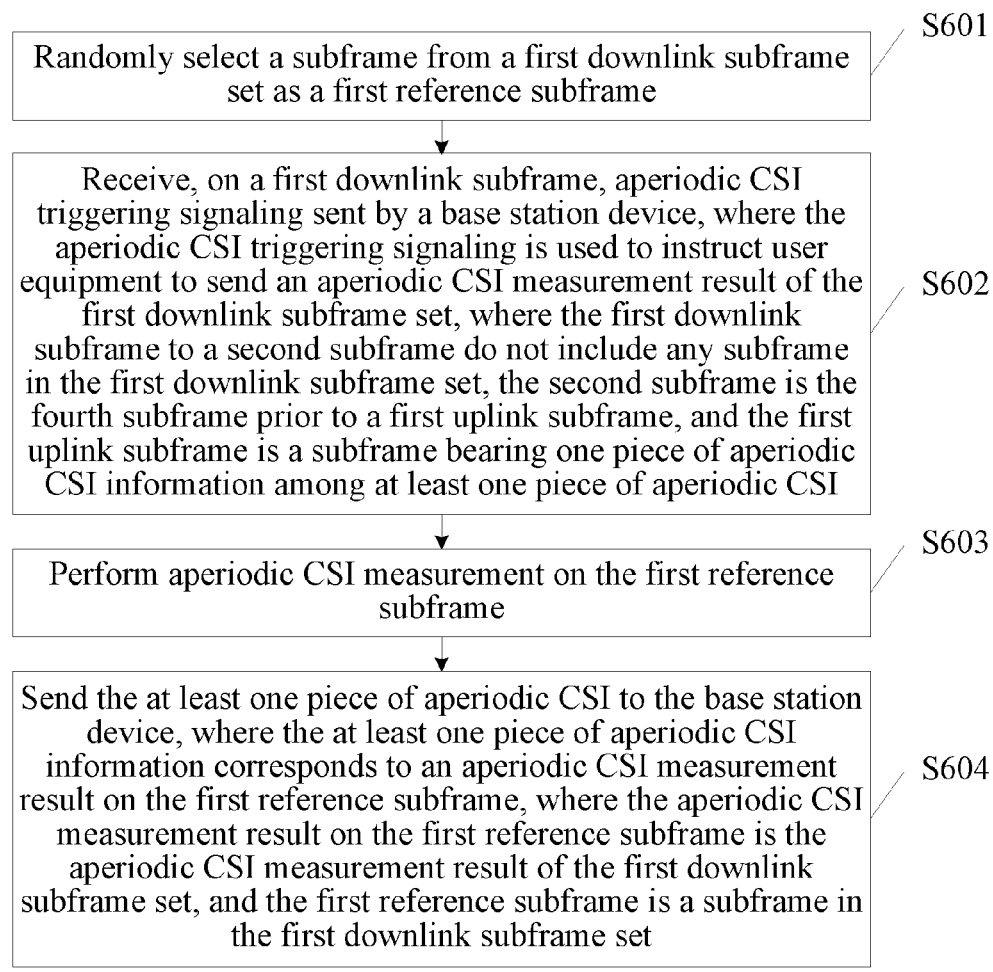
FIG. 19 is a flowchart of still another method for reporting channel state information according to an embodiment of the present invention.

Refer to FIG. 19, which is a flowchart of still another method for reporting channel state information according to an embodiment of the present invention. The method includes the following steps:

Step S601: Randomly select a subframe from a first downlink subframe set as a first reference subframe.

For an aperiodic CSI reference subframe in a first subframe set, the UE selects, within each radio frame, a subframe that is in a same subframe set as a corresponding reporting subframe set as a CSI reference subframe, thereby lowering a restriction on a minimum UE capability required in a process of performing aperiodic CSI measurement by the UE.

As shown in FIG. 6, the UE may flexibly select subframe 4 or subframe 9 as a reference subframe for aperiodic CSI. Therefore, by using this method, a minimum requirement on the UE can be effectively lowered, so that within each radio frame, the UE can report, by updating CSI measurement information only once, aperiodic CSI measurement information that is obtained through measurement on the radio frame or a previous radio frame and corresponds to a latest first subframe set during aperiodic CSI reporting.

Because there is no fixed CSI reference subframe in this embodiment, after receiving corresponding reported aperiodic CSI, the base station device does not specify a specific CSI reference subframe configuration, but the base station device may determine that content included in the aperiodic CSI is a result obtained through corresponding measurement on downlink subframes in first subframe sets in two latest radio frames.

Step S602: Receive, on a first downlink subframe, aperiodic CSI triggering signaling sent by a base station device, where the aperiodic CSI triggering signaling is used to instruct user equipment to send an aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among at least one piece of aperiodic CSI.

Step S602 is the same as step S503 in the embodiment shown in FIG. 18, and is not described herein.

Step S603: Perform aperiodic CSI measurement on the first reference subframe.

Step S604: Send the at least one piece of aperiodic CSI to the base station device, where the at least one piece of aperiodic CSI information corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

Step S603 and step S604 are respectively the same as step S402 and step S403 in the embodiment shown in FIG. 17 or step S504 and step S505 in the embodiment shown in FIG. 18, and are not described herein.

It can be seen that according to a method for reporting channel state information provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set; the reference subframe may be selected by the user equipment, and an implementation process is easy and convenient.

Figure 20:
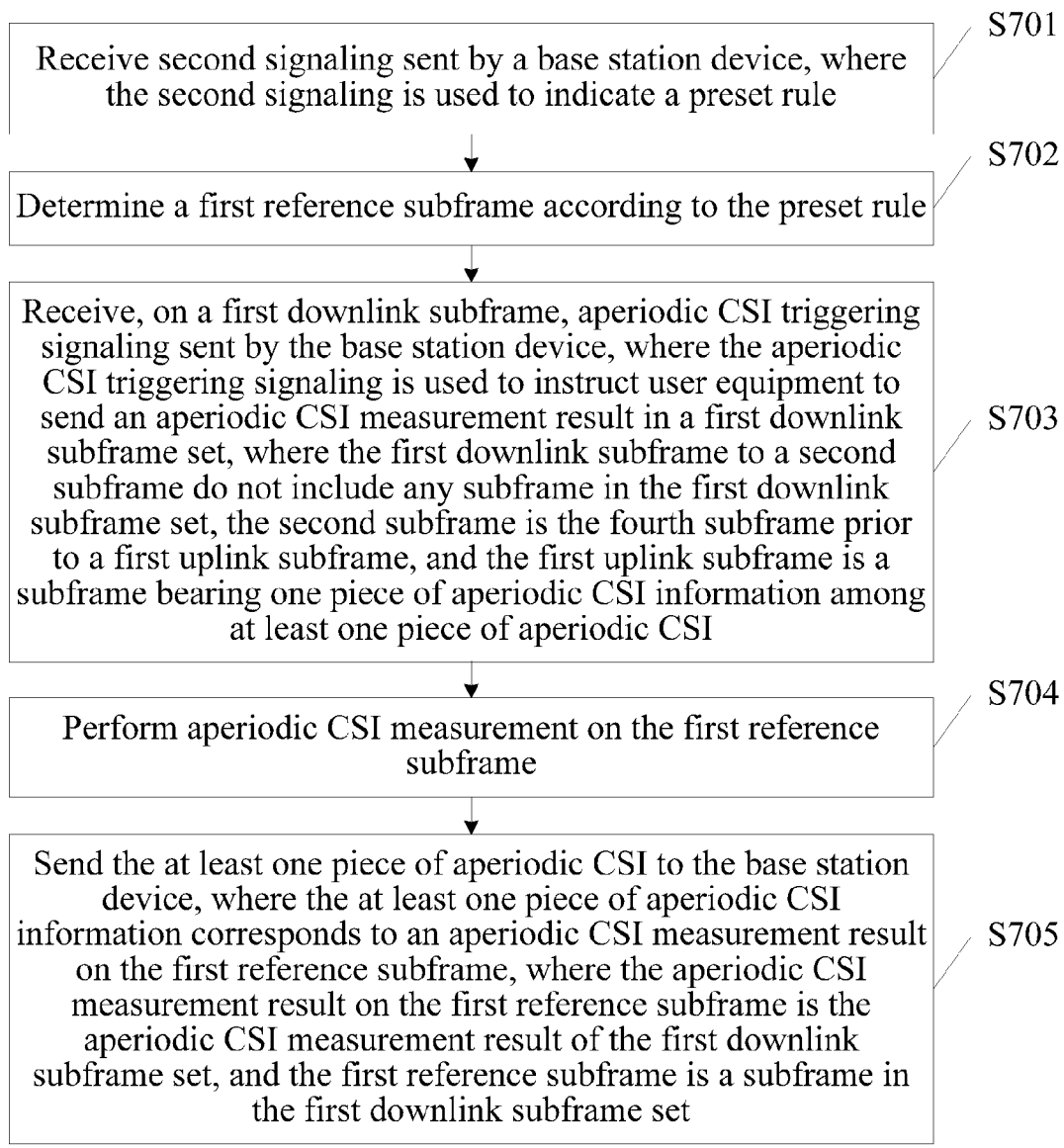
FIG. 20 is a flowchart of still another method for reporting channel state information according to an embodiment of the present invention.

Refer to FIG. 20, which is a flowchart of still another method for reporting channel state information according to an embodiment of the present invention. The method includes the following steps:

Step S701: Receive second signaling sent by a base station device, where the second signaling is used to indicate a preset rule.

Step S702: Determine a first reference subframe according to the preset rule.

For an aperiodic CSI reference subframe in a first subframe set, a predefined rule is used and measurement is performed on only one aperiodic CSI reference resource within each radio frame, so that a restriction on a minimum UE capability required in a process of performing aperiodic CSI measurement by the UE is lowered. The aperiodic CSI reference subframe may correspond to multiple pieces of reported aperiodic CSI.

The predefined CSI rule may be that the predefined CSI reference subframe is, a set of downlink subframes corresponding to a same type of CSI reporting are sorted according to subframe indexes, and a subframe whose subframe index is the largest or whose subframe index is the smallest is selected as the CSI reference subframe corresponding to a subframe set 2.

As shown in FIG. 5, according to downlink subframe grouping information sent by the base station device, information about downlink subframes (subframes 4 and 9) included in the first subframe set can be obtained. Because the first subframe set has the foregoing aperiodic CSI reference subframe configuration problem, a CSI reference subframe corresponding to two possible aperiodic CSI triggering subframes needs to be determined, whether aperiodic CSI triggering is performed on a subframe 0 or a subframe 5. If sorting is performed according to subframe indexes and a subframe whose subframe index is the smallest is used as the CSI reference subframe corresponding to the subframe set 2, in this example, the subframe 4 is selected as a reference subframe in each radio frame; if a subframe whose subframe index is the largest is used as the CSI reference subframe corresponding to the subframe set 2, in this example, the subframe 9 is selected as a reference subframe in each radio frame.

If selection is performed according to the smallest subframe index, subframe 4 is the reference subframe for aperiodic CSI. Regardless of which position an aperiodic triggering subframe is located at, where in this example, a triggering position may be a downlink subframe 0 or 5, the UE reports a CSI measurement result on the subframe 4. Specifically, when aperiodic CSI is triggered on the subframe 5, the UE reports a CSI measurement result on the subframe 4 in a current radio subframe; or when aperiodic CSI is triggered on the subframe 0, the UE reports a CSI measurement result on the subframe 4 in a previous radio subframe.

Step S703: Receive, on a first downlink subframe, aperiodic CSI triggering signaling sent by the base station device, where the aperiodic CSI triggering signaling is used to instruct user equipment to send an aperiodic CSI measurement result of the first downlink subframe set, where a subframe between the first downlink subframe and a second subframe does not include any subframe in the first downlink subframe set, the second subframe is the fourth subframe prior to a first uplink subframe, and the first uplink subframe is a subframe bearing one piece of aperiodic CSI information among at least one piece of aperiodic CSI.

Step S703 is the same as step S503 in the embodiment shown in FIG. 18 or step S602 in the embodiment shown in FIG. 9, and is not described herein.

Step S704: Perform aperiodic CSI measurement on the first reference subframe.

Step S705: Send the at least one piece of aperiodic CSI to the base station device, where the at least one piece of aperiodic CSI information corresponds to an aperiodic CSI measurement result on the first reference subframe, where the aperiodic CSI measurement result on the first reference subframe is the aperiodic CSI measurement result of the first downlink subframe set, and the first reference subframe is a subframe in the first downlink subframe set.

Step S704 and step S705 are respectively the same as step S402 and step S403 in the embodiment shown in FIG. 17 or step S504 and step S505 in the embodiment shown in FIG. 18 or step S603 and step S604 in the embodiment shown in FIG. 19, and are not described herein.

It can be seen that according to a method for reporting channel state information provided in this embodiment of the present invention, user equipment performs aperiodic CSI measurement on a set reference subframe in a downlink subframe set, and sends a measurement result to a base station device. In this way, it can be ensured that the base station device effectively receives the aperiodic channel state measurement result, which is sent by the user equipment, of the downlink subframe set; the reference subframe may be determined according to a preset rule on which the base station device and the user equipment agree, and an implementation process is easy and convenient.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also understand that the embodiments described in this specification all belong to exemplary embodiments, and the involved actions and modules are not necessarily mandatory to the present invention.

In the foregoing embodiments, the description of each embodiment has respective focuses. For a part that is not described in detail in an embodiment, reference may be made to related descriptions in other embodiments.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is used as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In summary, what is described above is merely exemplary embodiments of the technical solutions of the present invention, but is not intended to limit the protection scope of the present invention. Any modification, equivalent replacement, or improvement made without departing from the spirit and principle of the present invention shall fall within the protection scope of the present invention.

What is claimed is:

1. A base station device, comprising: a transmitter, a receiver, and a processor telecommunicatively connected to the the transmitter and the receiver, wherein
    the transmitter is configured to: send aperiodic channel state information (CSI) triggering signaling to a terminal device on a first downlink subframe, wherein the aperiodic CSI triggering signaling instructs the terminal device to send an aperiodic CSI measurement result of a first downlink subframe set; and
    the receiver is configured to: receive at least one piece of aperiodic CSI from the terminal device, wherein the at least one piece of aperiodic CSI corresponds to an aperiodic CSI measurement result on a first reference subframe, wherein
    the aperiodic CSI measurement result on the first reference subframe is the aperiodic CSI measurement result of the first downlink subframe set, and the first reference subframe is a subframe in the first downlink subframe set; and
    there is no any subframe in the first downlink subframe set between the first downlink subframe and a second subframe, the second subframe is the fourth subframe prior to a first uplink subframe, and the first uplink subframe is a subframe bearing one piece of aperiodic CSI among the at least one piece of aperiodic CSI.

2. The base station device according to claim 1, wherein the first reference subframe is a subframe with the smallest index in the first downlink subframe set.

3. A terminal device, comprising: a transmitter, a receiver, and a processor telecommunicatively connected with the transmitter and the receiver, wherein
    the receiver is configured to: receive, on a first downlink subframe, aperiodic channel state information (CSI) triggering signaling from a base station device, wherein the aperiodic CSI triggering signaling instructs the terminal device to send an aperiodic CSI measurement result of a first downlink subframe set;
    the processor is configured to perform aperiodic CSI measurement to obtain an aperiodic CSI measurement result on a first reference subframe; and
    the transmitter, configured to send at least one piece of aperiodic CSI to the base station device, wherein the at least one piece of aperiodic CSI information corresponds to the aperiodic CSI measurement result on the first reference subframe, wherein
    the aperiodic CSI measurement result on the first reference subframe is the aperiodic CSI measurement result of the first downlink subframe set, and the first reference subframe is a subframe in the first downlink subframe set; and
    there is no any subframe in the first downlink subframe set between the first downlink subframe and a second subframe, the second subframe is the fourth subframe prior to a first uplink subframe, and the first uplink subframe is a subframe bearing one piece of aperiodic CSI information among the at least one piece of aperiodic CSI.

4. The terminal device according to claim 3, wherein the first reference subframe is a subframe with the smallest index in the first downlink subframe set.

5. A method for receiving channel state information, comprising:
    sending, by a base station device, aperiodic channel state information (CSI) triggering signaling to a terminal device on a first downlink subframe, wherein the aperiodic CSI triggering signaling instructs the terminal device to send an aperiodic CSI measurement result of a first downlink subframe set;
    receiving, by the base station device, at least one piece of aperiodic CSI from the terminal device, wherein the at least one piece of aperiodic CSI corresponds to an aperiodic CSI measurement result on a first reference subframe, wherein
    the aperiodic CSI measurement result on the first reference subframe is the aperiodic CSI measurement result of the first downlink subframe set, and the first reference subframe is a subframe in the first downlink subframe set; and
    there is no any subframe in the first downlink subframe set between the first downlink subframe and a second subframe, the second subframe is the fourth subframe prior to a first uplink subframe, and the first uplink subframe is a subframe bearing one piece of aperiodic CSI among the at least one piece of aperiodic CSI.

6. The method according to claim 5, wherein the first reference subframe is a subframe with the smallest index in the first downlink subframe set.

7. A method for reporting channel state information, comprising:
    receiving, by a terminal device on a first downlink subframe, aperiodic channel state information (CSI) triggering signaling from a base station device, wherein the aperiodic CSI triggering signaling instructs the terminal device to send an aperiodic CSI measurement result of a first downlink subframe set;
    performing, by the terminal device, aperiodic CSI measurement to obtain an aperiodic CSI measurement result on a first reference subframe; and
    sending, by the terminal device, at least one piece of aperiodic CSI to the base station device,
    wherein the at least one piece of aperiodic CSI information corresponds to the aperiodic CSI measurement result on the first reference subframe, the aperiodic CSI measurement result on the first reference subframe is the aperiodic CSI measurement result of the first downlink subframe set, and the first reference subframe is a subframe in the first downlink subframe set; and there is no any subframe in the first downlink subframe set between the first downlink subframe and a second subframe, the second subframe is the fourth subframe prior to a first uplink subframe, and the first uplink subframe is a subframe bearing one piece of aperiodic CSI information among the at least one piece of aperiodic CSI.

8. The method according to claim 7, wherein
the first reference subframe is a subframe with the smallest index in the first downlink subframe set.

* * * * *

UNITED STATES PATENT AND TRADEMARK OFFICE
CERTIFICATE OF CORRECTION

| | |
|---|---|
| PATENT NO. | : 10,085,166 B2 |
| APPLICATION NO. | : 15/356003 |
| DATED | : September 25, 2018 |
| INVENTOR(S) | : Li et al. |

It is certified that error appears in the above-identified patent and that said Letters Patent is hereby corrected as shown below:

On the Title Page

Item (56), References Cited, Other Publications, "31rd Generation Partnership Project" should read -- 3rd Generation Partnership Project --.

Signed and Sealed this
Third Day of September, 2019

Andrei Iancu
*Director of the United States Patent and Trademark Office*